US005575108A

United States Patent [19]
Weder et al.

[11] Patent Number: 5,575,108
[45] Date of Patent: Nov. 19, 1996

[54] APPARATUS FOR STEMMING FLOWERS

[75] Inventors: Donald E. Weder, Highland; William F. Straeter, Breese; Joseph G. Straeter, Highland, all of Ill.; Paul Fantz, Imperial, Mo.; Gary E. Wilson, Troy, Ill.; Charles E. Schlueter, St. Louis, Mo.

[73] Assignee: Southpac Trust International, Inc., Oklahoma City, Okla.

[21] Appl. No.: 443,498

[22] Filed: May 18, 1995

Related U.S. Application Data

[60] Division of Ser. No. 144,917, Oct. 28, 1993, which is a continuation-in-part of Ser. No. 949,411, Sep. 22, 1992, Pat. No. 5,391,208.

[51] Int. Cl.⁶ .......................................................... A01C 1/00
[52] U.S. Cl. .................................................. 47/1.01; 47/55
[58] Field of Search ............................... 47/55, 1 B, 1.01; 29/564.6, 564.8

[56] References Cited

U.S. PATENT DOCUMENTS

| | | |
|---|---|---|
| 4,282,644 | 8/1981 | Petree . |
| 4,348,832 | 9/1982 | Hauser . |
| 4,667,397 | 5/1987 | Day et al. . |
| 4,928,424 | 5/1990 | Campanelli . |
| 5,020,209 | 6/1991 | Fullard . |
| 5,174,794 | 12/1992 | Brownlee et al. . |

FOREIGN PATENT DOCUMENTS

| | | |
|---|---|---|
| 937617 | 3/1948 | France . |
| 2436556 | 9/1978 | France . |

OTHER PUBLICATIONS

Instructions of B & K Floral Stemming Machine, B & K Tool & Die Stamping, 199 South Fehr Way, Bay Shore, New York 11706.
Article Link Magazine, "Care and Handling by the Wholesaler: What's Being Done?", Sep. 1991.
Brochure, B & K Floral Stemming Products, B & K Tool, Die and Stamping company, 199 South Fehr Way, Bayshore, New York 11706.
Brochure, Porta Pick Stemming Machine, B & K Tool, Die and Stamping Company, 1635 Weirfield Street, Ridgewood, New York 11385.

*Primary Examiner*—Terry Lee Melius
*Assistant Examiner*—Joanne C. Downs
*Attorney, Agent, or Firm*—Dunlap & Codding, P.C.

[57] ABSTRACT

A method and apparatus for stemming a flower in which the flower stem is cut substantially simultaneously with attaching a flower pick to the flower stem, thereby eliminating the separate steps of cutting the flower stem and subsequently attaching a stem pick by combining these two operations. In another aspect of the invention, the flower stem is cut in an environment which displaces air from the region of the severed plant stem by submerging the portion of the plant stem in the region of severance under water or by subjecting it to a flow of water or a spray of water or other material which would prevent formation of an air gap in the vascular tissue of the plant and/or skinning over of the tubules. The flower stem may be cut under water and a pick applied under water or cut of the water or out of the water. The water or other material used for displacing air in the region of severance may contain a floral preservative or nutrient or bacteria stat or other material to help prolong the shelf life of the flower. An electromechanical arrangement may replace former manually operated functions.

7 Claims, 15 Drawing Sheets

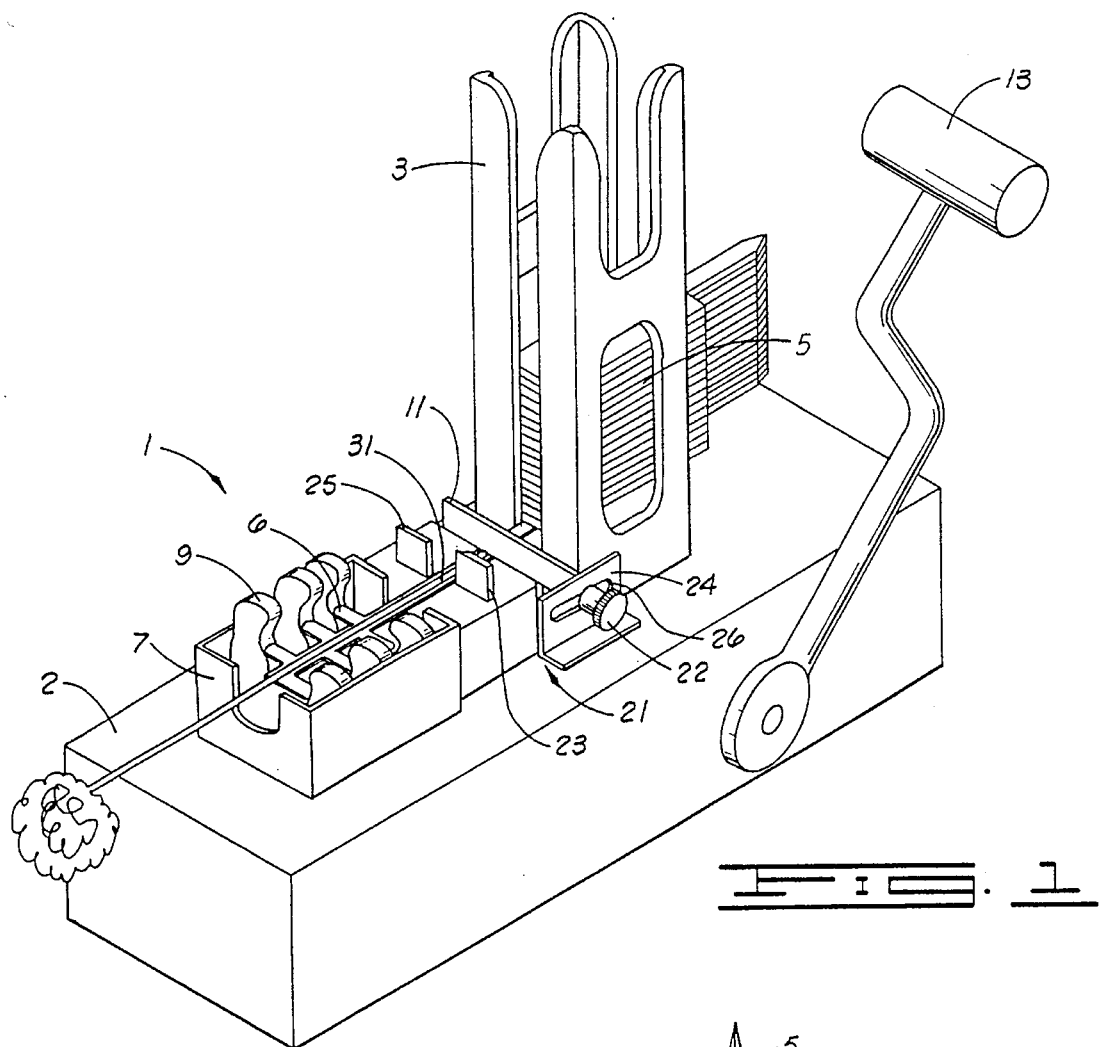
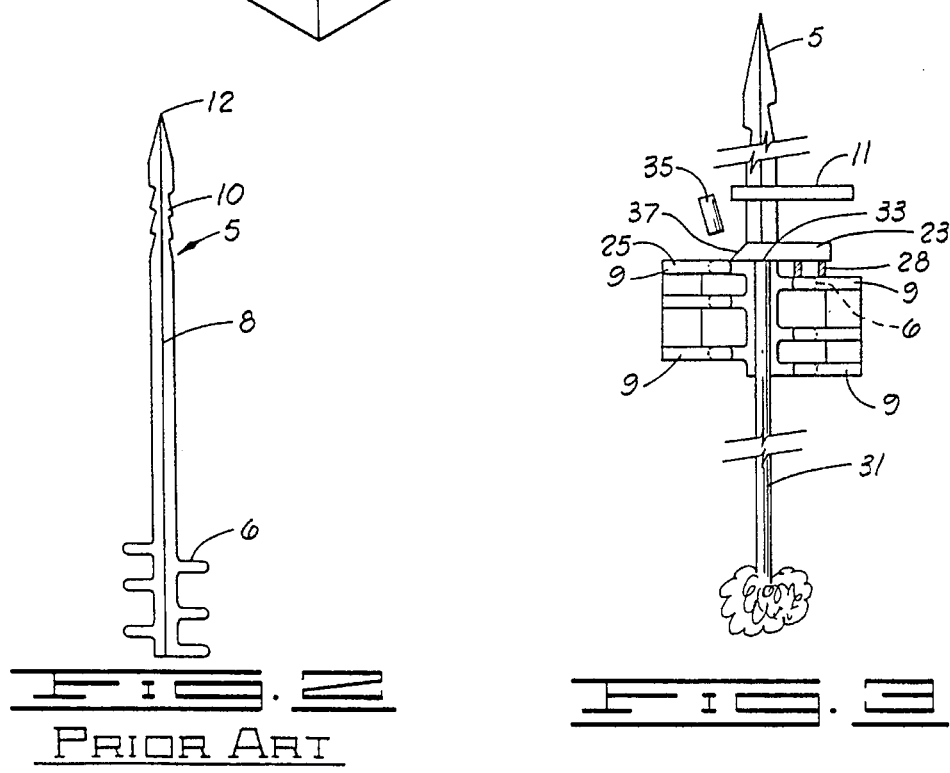
FIG. 1
FIG. 2
PRIOR ART
FIG. 3

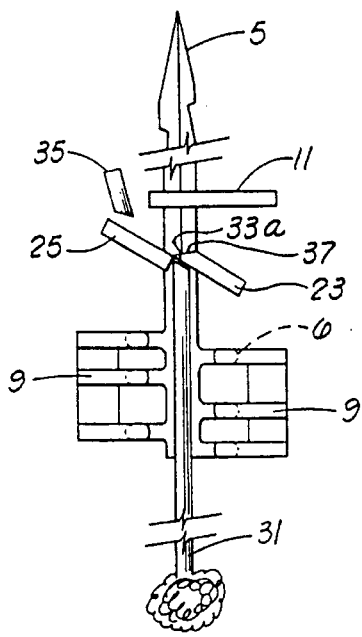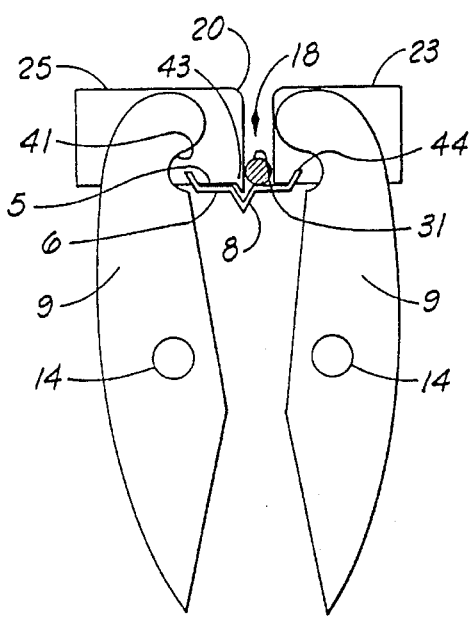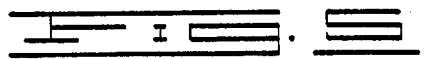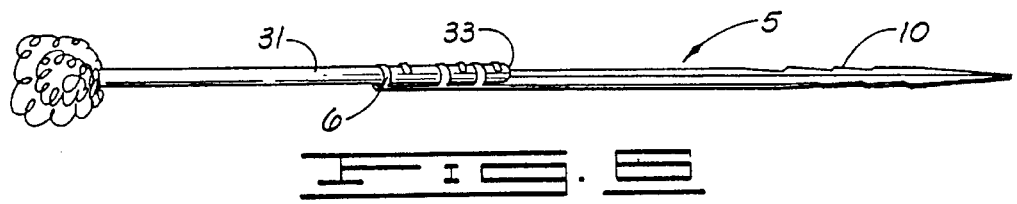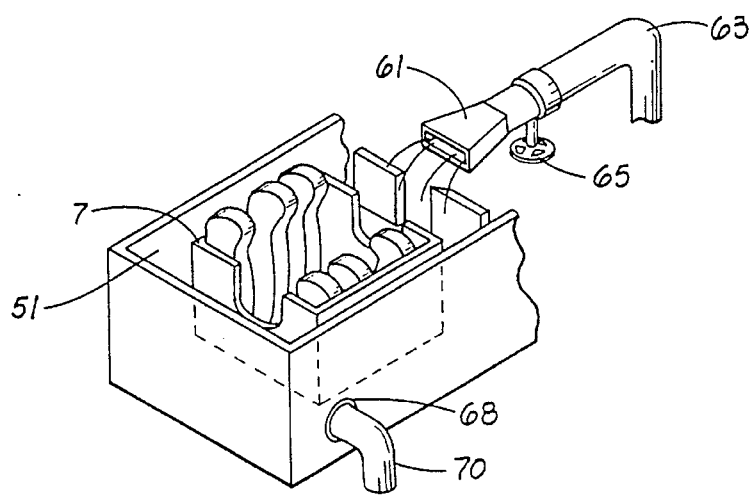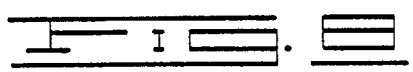

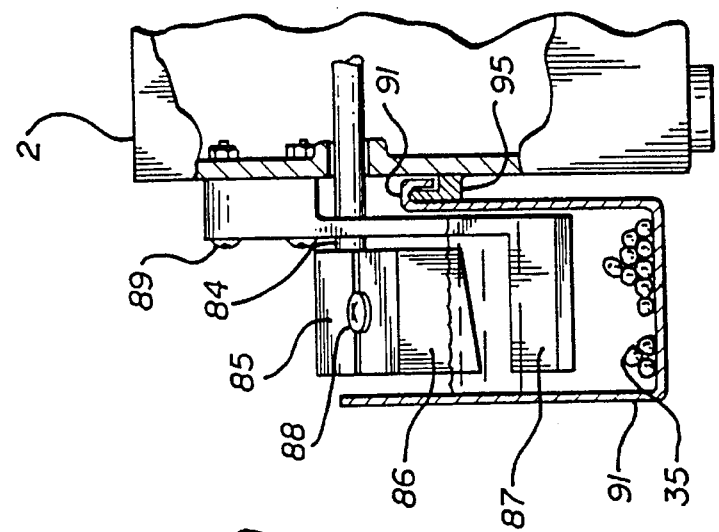
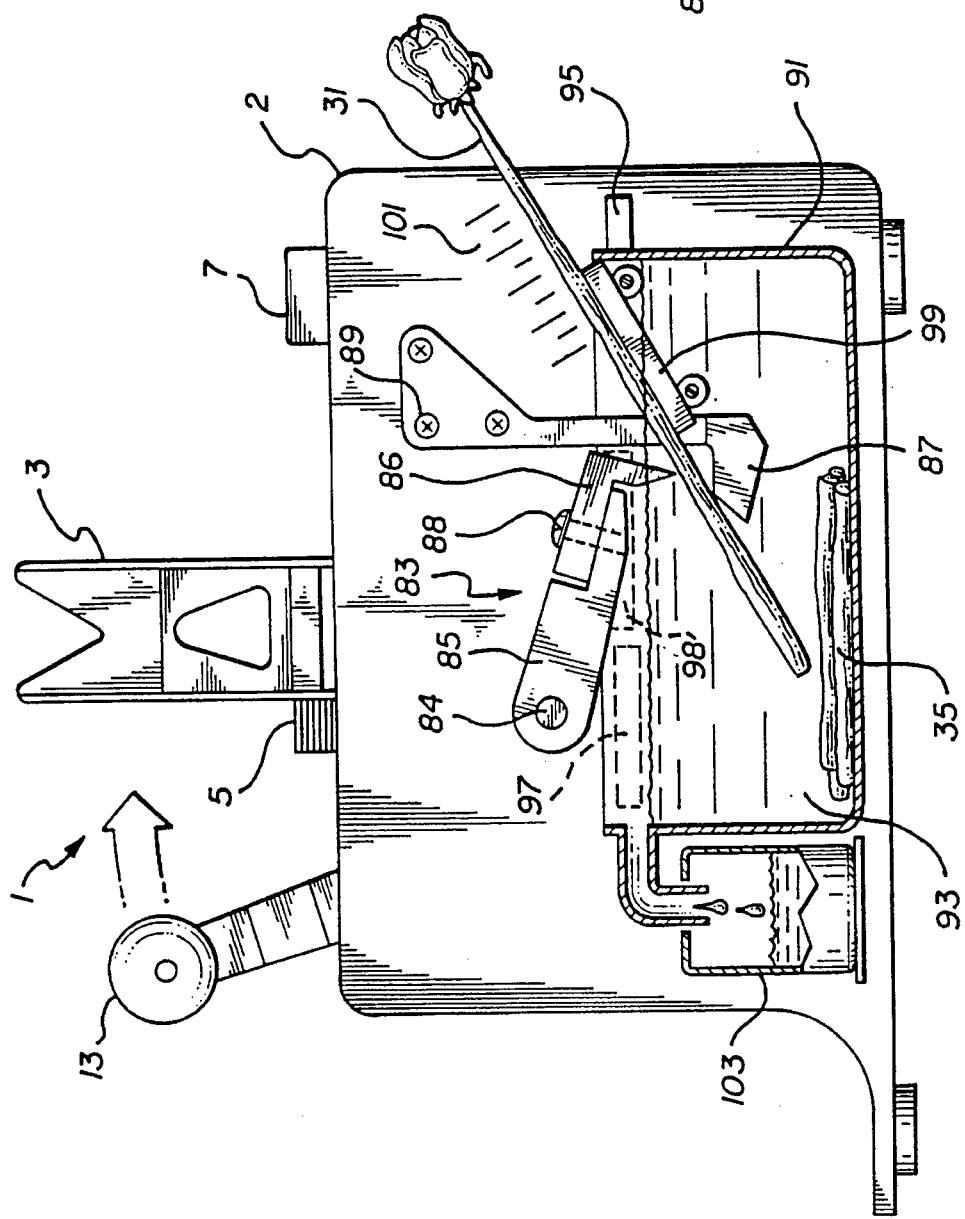
FIG. 16B
FIG. 16A

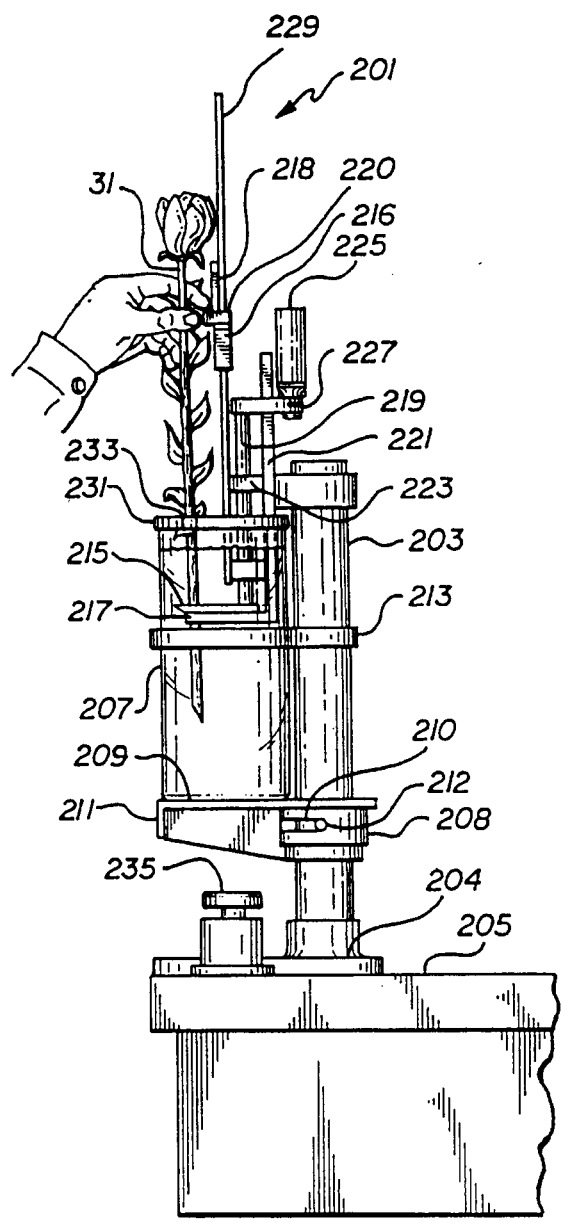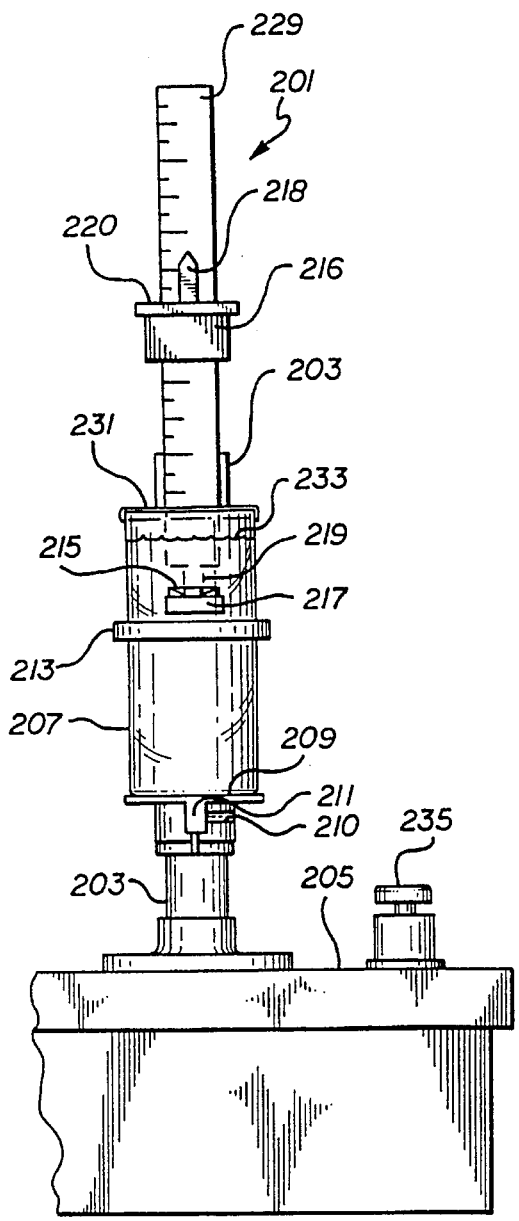

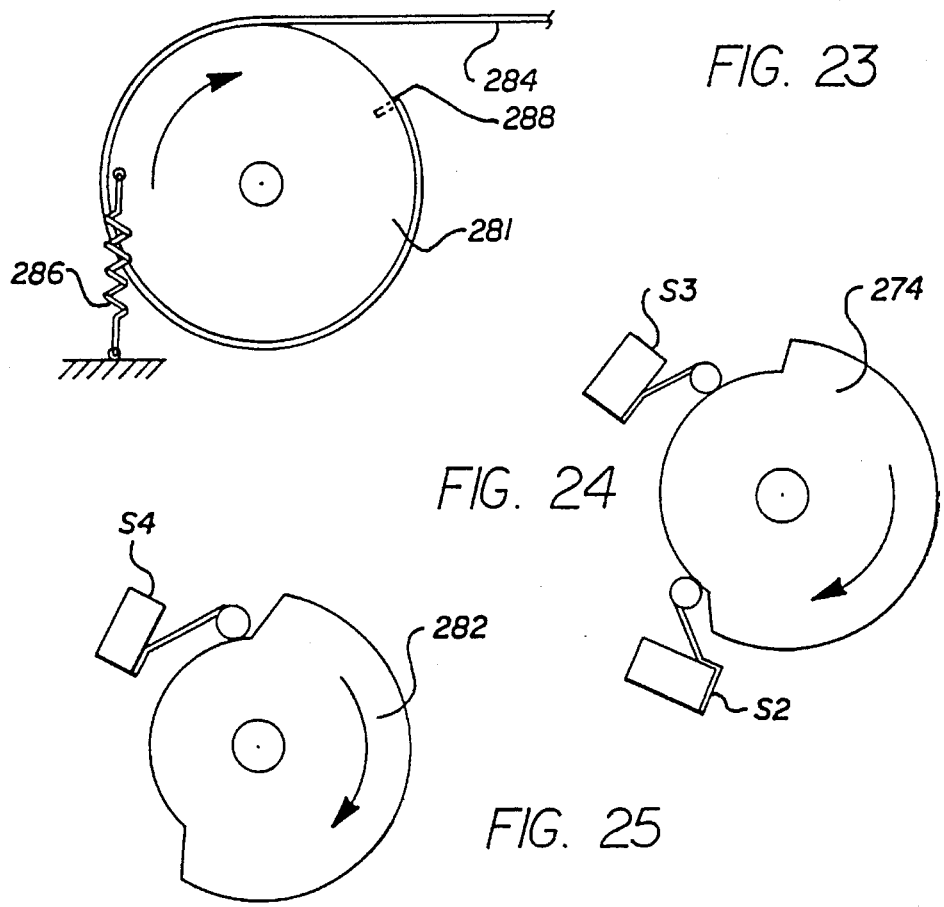
FIG. 23
FIG. 24
FIG. 25
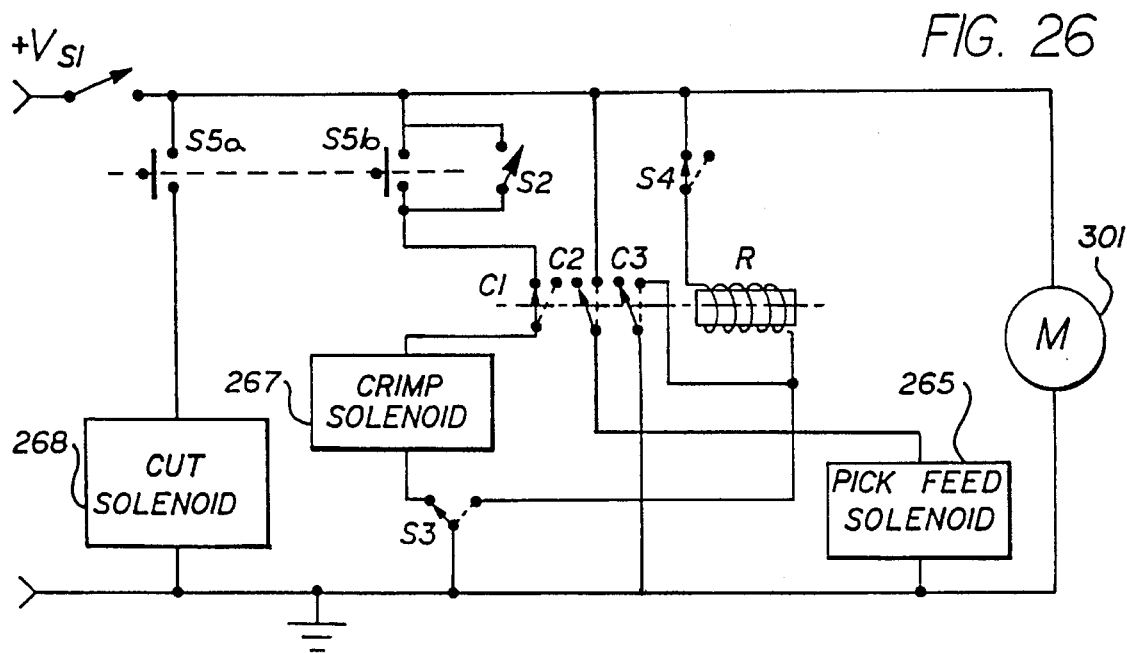
FIG. 26

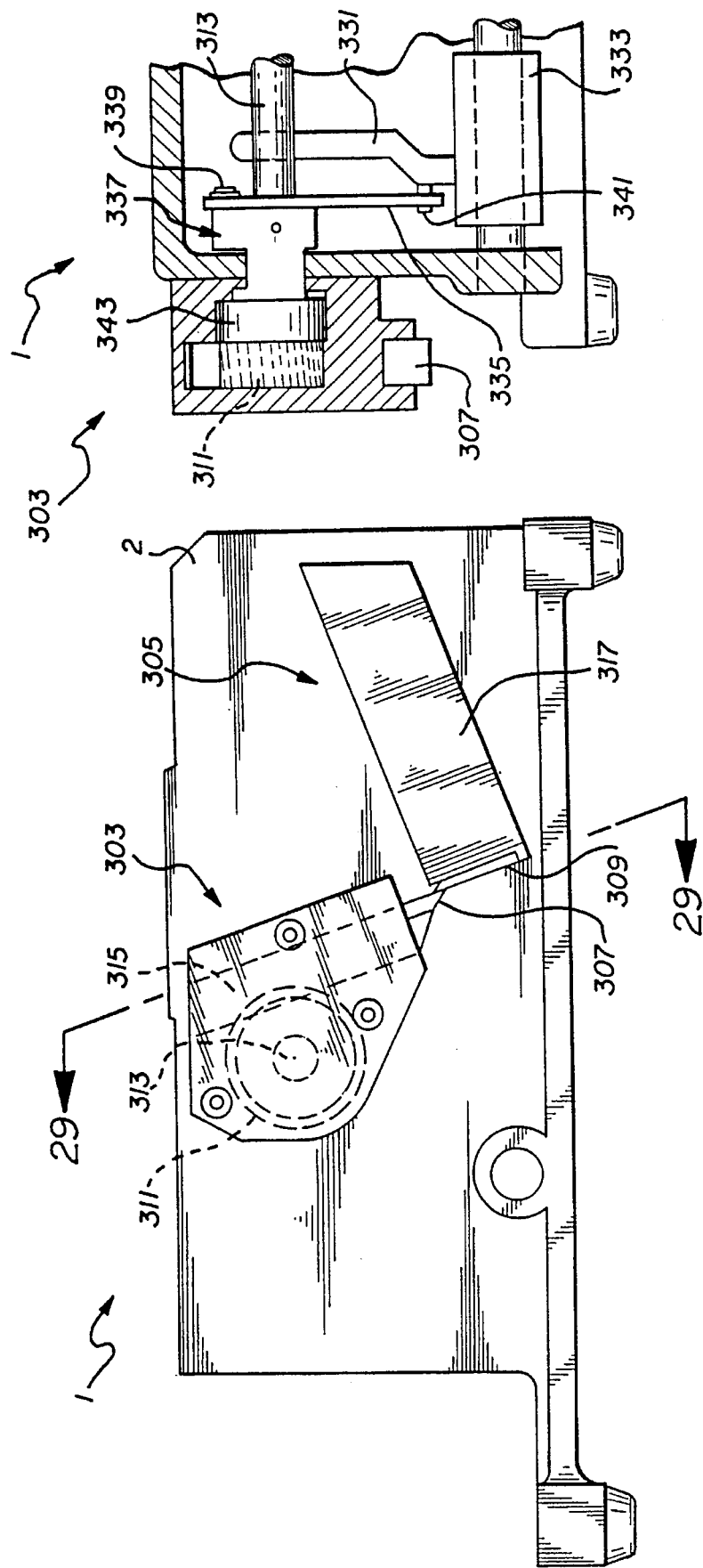

APPARATUS FOR STEMMING FLOWERS

CROSS REFERENCE TO RELATED APPLICATION

This application is a divisional of U.S. Ser. No. 08/144,917, filed Oct. 28, 1993, entitled "APPARATUS FOR STEMMING FLOWERS", which is a Continuation-In-Part of application Ser. No. 07/949,411 filed Sep. 22, 1992, new U.S. Pat. No. 5,391,208.

BACKGROUND OF THE INVENTION

1. Field of the Invention

This invention relates to the field of preparing floral arrangements, and in particular to preparing individual flowers for such floral arrangements by inserting on the stem of a flower a stem pick. The invention also relates to the field of cutting flower stems, and more particularly to cutting flower stems in an airless environment. Finally, the invention relates to methods and apparatuses combining these concepts in various ways.

2. Brief Description of the Prior Art

Floral stem picks have been in use for many years for the purposes of strengthening and supporting the stems of individual botanical items, such as flowers, so that they can be easily handled and placed in position, for example in floral foam, without crushing the stems of the flowers. Such prior art stem picks may be made of steel and may have a number of fingers which wrap around and grasp the stem of the flower. In this manner, the stem pick acts as a rigid prolongation of the flower stem. Prior to application of the stem pick to the flower stem, it is usually necessary to cut the stem of the flower to a length such that the finished combination of flower, flower stem and stem pick is of the proper length for the floral arrangement. In the past, the cutting of the flower stem to an appropriate length has been done manually or with an automatic cutter as a separate step in the preparation of the flower prior to attachment of the stem pick.

Processing flowers by cutting underwater is becoming popular by wholesalers and florists. Many wholesalers are cutting all of their flower underwater, particularly roses, imports, and more expensive flowers. The benefit in cutting flower stems underwater is that it prevents the formation of an air gap or air bubbles in the vascular tissue of the plant, thereby interrupting the transpiration stream of water within the xylem. This procedure also avoids the skinning effect, i.e., it prevents sealing of the tubules of the stem with sap that oozes from the end of the flower stem after the stem is cut. The water thus, in addition to displacing air from the raw cut flower stem, prevents or retards skinning over the tubules which occurs in the natural healing process for the damaged (cut) plant.

In spite of the benefits of underwater cutting, many wholesalers and florists, especially during the holiday seasons, find that the time constraints and the volume of flowers necessary to process makes it impractical to cut all of the flowers under water. In such a case, the lesser quality flowers are cut without submergence in water. Additionally, a water source may not be handy or the extra time taken to manipulate the flower stems to both cut the stem underwater and, in a subsequent step, attach a stem pick, simply requires too much time and is not cost effective.

Pick stemming machines have been developed and manufactured in both a table top model and a portable model in which a stack of stem picks is inserted in the machine, and by moving a handle, an operator can cause the stem pick to attach to the flower stem, and the assembled flower and stem pick arrangement is then manually removed from the machine. Such machines have been made by B & K Tool, Die and Stamping Co., Inc. located in Ridgewood, N.Y. While such machines are effective to attach a stem pick to a flower stem, the problems of interrupting the transpiration stream in the flower stem and skinning over of the tubules are not solved, and the life of the floral arrangement containing flowers with picks applied by the machines of the prior art is foreshortened.

SUMMARY OF THE INVENTION

In the following description, the term "botanical item" is used to mean a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping. For convenience only, the term "flower" will be used generically as a substitute for the term "botanical item", such that when the term "flower" is used, what is meant is the term "botanical item".

As used herein the term "growing medium" means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth. Such life enhancing additives are readily available and are made and sold under various trade names.

The term "water bath", as used herein, includes, but is not limited to, containers or chambers of water, a flower or stream of water, steam, water spray, or water mist.

The phrase "substantially simultaneous", as used herein to describe the temporal relationship between severing a flower stem and attaching a stem pick to the flower stem, is to be understood to include: severing the flower stem prior to the initiation of or the completion of the attachment of a stem pick to the flower stem; attaching a stem pick to the flower stem prior to the initiation of or the completion of the severing of the flower stem; and initiating or completing the severing of the flower stem at the same time as initiating or completing the attaching of a stem pick to the flower stem.

The present invention overcomes the disadvantages associated with prior art methods and apparatuses as discussed above by providing a method and apparatus for stemming a flower in which the flower stem is cut substantially simultaneously with attaching a floral pick to the flower stem. This eliminates the separate steps of cutting the flower stem and subsequently attaching a stem pick, by combining these two operations essentially into one operation.

In another aspect of the invention, the flower stem is cut in an environment which displaces air from the region of the severed plant stem by submerging the portion of the plant stem in the region of severance underwater or by subjecting it to a flow of water or a spray of water or other growing medium which would prevent formation of an air gap in the vascular tissue of the plant and/or skinning over of the tubules. If desired, the water or growing medium used for displacing air in the region of severance may contain a floral preservative or nutrient or bacteria stat or other material to help prolong the shelf life of the flower.

In another aspect of the invention, electromechanical devices replace manually operated ones to implement automatic operation.

Other features of the invention will be become evident by reference to the following description having reference to the accompanying drawings.

BRIEF DESCRIPTION OF THE DRAWINGS

FIG. 1 is a perspective view of a floral stemming machine incorporating the pick attachment assembly and stem cutting combination according to the present invention;

FIG. 2 shows a prior art steel stem pick;

FIG. 3 is a schematic partial plan view of the pick attachment assembly and the flower stem cutting arrangement, with the cutting knife operating to cut the flower stem perpendicular to its axis;

FIG. 4 is a schematic partial plan view of the pick attachment assembly and the flower stem cutting arrangement, with the cutting knife operating to cut the flower stem at an angle with respect to the axis of the flower stem;

FIG. 5 is a partial front view of the stemming machine of FIG. 1 showing an arrangement of the stem pick attachment jaws and cutting knife assembly with the flower stem offset from the axis of the stem pick;

FIG. 6 illustrates a flower with its stem cut off and with a stem pick attached to the extremity of the flower stem;

FIG. 9 shows the cutting region of a stemming machine being doused by water spray issuing from a nozzle;

FIG. 16A illustrates an improvement over the side cutting arrangement shown in FIGS. 12–14, with which a flower stem is cut under the surface of a contained fluid;

FIG. 16B is a partial cross sectional right end view of the flower stemming machine of FIG. 16A;

FIG. 17 is a side view of an alternate embodiment of a flower stem cutter, wherein the stem is cut under water;

FIG. 18 is a front elevation view of the flower stem cutter of FIG. 17;

FIG. 23 schematically represents the pick feed wheel of the transmission;

FIG. 24 shows a side view of the crimp timing cam of the transmission;

FIG. 25 shows a side view of the pick feed cam of the transmission;

FIG. 26 is an electrical schematic of the operation of an automated flower stemming machine made in accordance with the invention;

FIG. 29 is a side elevation view of a linear cutter assembly attached to the housing of a flower stemming machine;

FIG. 30 is a partial right side cross sectional view of the cutter assembly and some of the internal mechanics of the flower stemming machine shown in FIG. 29;

DETAILED DESCRIPTION OF THE PREFERRED EMBODIMENTS

Figure 7:
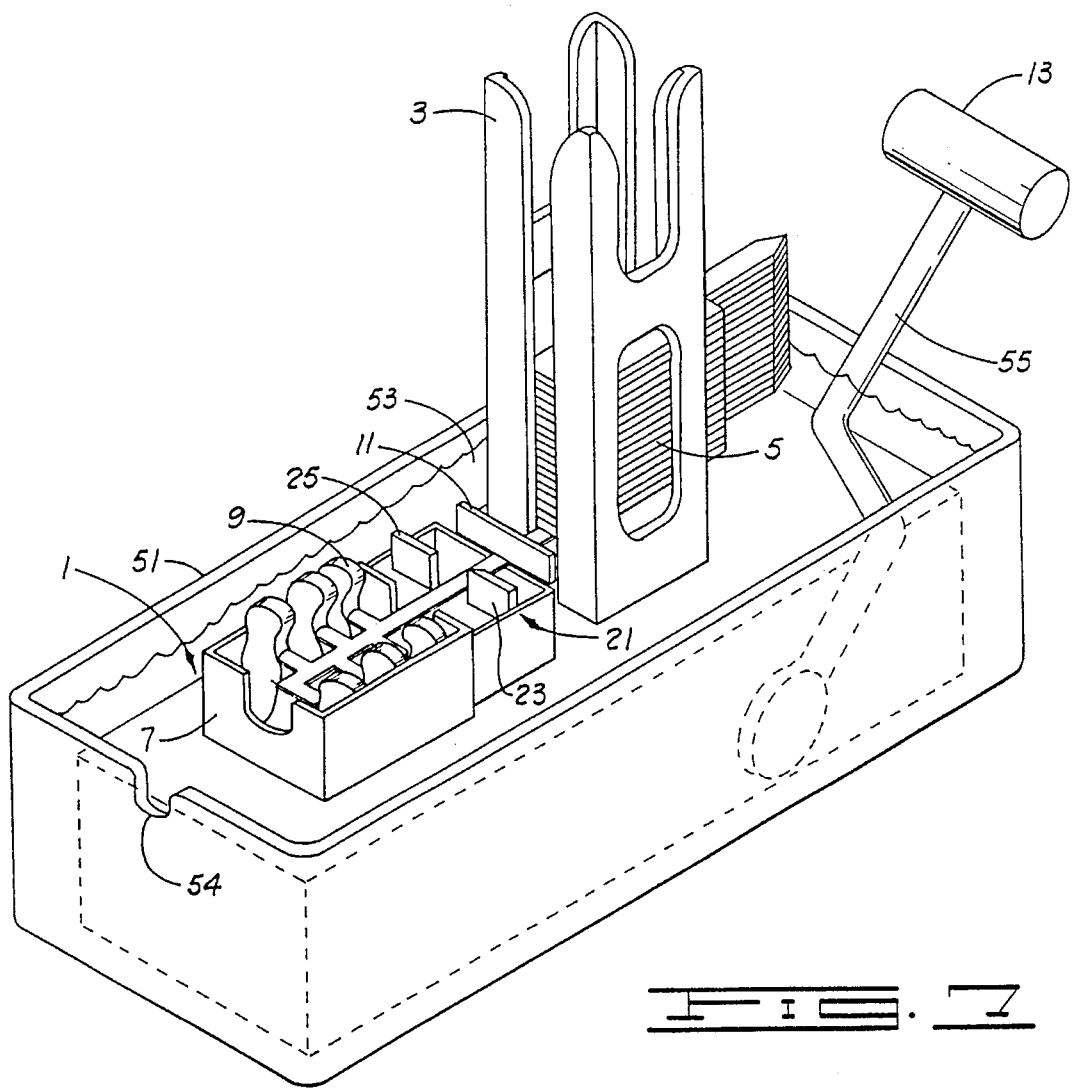
FIG. 7 is a perspective view of a stemming machine, similar to that of FIG. 1, showing the embodiment of the invention wherein the flower stem cutting and stem pick attachment procedures are conducted under water.

Referring to FIG. 1, a flower stemming machine is illustrated, and all illustrated parts of the machine in FIG. 1 are known from the prior art with the exception of the addition of a cutter assembly, and the addition of an adjustable stem stop.

Stemming machine 1 includes a base 2 upon which is mounted a stem pick stacker 3 carrying a number of stem picks 5, a stem pick attachment assembly 7, a cutting assembly 21, and an adjustable stem stop 11. One stem pick 5 is shown in a position ready for attachment to the extremity of a flower stem, the stem pick 5 having a plurality of fingers 6 extending horizontally within the attachment assembly 7 and between movable jaws 9. A flower stem precut or selected to a length approximately ⅛ inch to ½ inch longer than its length after cutting, is inserted in the attachment assembly 7 between jaws 9 and moved forward such that the face end of the flower stem abuts the front face of adjustable stem stop 11.

While the flower stem is in the position ready to receive an attached stem pick, handle 13 is moved in a downward direction which draws jaws 9 on each side of attachment assembly 7 toward one another. At the same time, knife 23 and backup knife 25 move toward one another to sever the flower stem 31 by the scissors action between the plane surfaces of knife 23 and backup knife 25, thereby effecting a shear action to sever the end of the flower stem from the rest of the flower. Desirably, cutting assembly 21 can be attached to the end jaws 9 in attachment assembly 7, so that the cutting of the flower stem occurs simultaneously with the bringing together of jaws 9 to crimp the fingers 6 of stem pick 5 without substantial redesign of the stemming machine mechanism.

In order to accommodate stems of different lengths, stem stop 11 is made adjustable by means of a thumbscrew 22 fitting through a slot 26 in adjustment bar 24. The end of stop 11 opposite that of thumb screw 22 can be a free end or may have a downward protrusion extending into a slot (not shown) in base 2 or other known means for giving stability to the end of stop 11 opposite thumb screw 22. To adjust the length of the cutoff portion of the flower stem, thumb screw 22 is loosened, stop 11 is slid left or right (in FIG. 1) to the desired position, and then thumb screw 22 is screwed tight to lock stop 11 in place.

FIG. 2 shows the outline of a prior art thin steel stem pick 5 having fingers 6, a V-grove channel 8 (better seen in FIG. 5), barbs or spikes 10, and a pointed tip 12.

FIG. 3 shows a schematic plan view of part of the stemming machine of FIG. 1 with a stem pick 5 in position between jaws 9 and partially bent in a direction to eventually embrace the stem 31 of a flower. The fingers 6 are shown to be partially curled (out of the paper in FIG. 3) by the action of the curved surfaces of jaws 9 but not yet clamped or cinched about the flower stem 31. At this point in the process of attaching the stem pick 5, knife 23 has already severed the end of flower stem 31, and the cutoff portion 35 of stem 31 is discharged from the machine.

As illustrated, movable knife 23 is fixed to the upper right jaw 9 by means of screws 28 or other fastening means, and the opposing jaw 9 is machined to have a cutting surface cooperating with knife blade 23 such that the upper left jaw 9 in FIG. 3 functions as the backup knife 25. It will be understood that both knife 23 and backup knife 25 can be operated by a mechanism not directly connected to jaws 9, or an additional pair of specially designed jaws 9 can be attached to the attachment assembly 7 and act as the knife and backup knife. Finally, instead of using the upper left jaw 9 as backup knife 25, a separate, removable, backup knife 25 can be attached to upper jaw 9 by screws or other fasteners. Removability permits ease of sharpening and replacement of the knife parts.

In FIG. 3, the knife 23 and backup knife 25 are shown attached to the upper right and upper left jaws 9 so as to reciprocate along a path perpendicular to the axes of stem pick 5 and flower stem 31.

In FIG. 4, the same cutting action as that described in connection with FIG. 3 is shown to take place by the cutter knife 23 and backup knife 25, with the exception that the knife components are aligned so that the cutting action is at an angle with respect to the axes of the stem pick 5 and flower stem 31. In this embodiment of the invention, the knife components 23 and 25 cannot be attached to the jaws 9 for obvious reasons. Cutting the flower stem 31 at an angle has the benefit of creating a greater cross-sectional area of the cut stem thereby enhancing the transpiration of water and/or nutrients through the xylem of the flower stem.

In FIG. 5, a pair of opposing jaws 9 are shown to be pivotable about corresponding pins 14, and the jaws, as shown, are in their fully open position. In this position, and noting that knife 23 and backup knife 25 are mechanically connected to the tops of opposing jaws 9, a gap 18 is defined within which the flower stem 31 is inserted and comes to rest on the top of stem pick 5. The top corners of knife parts 23, 25 are beveled so as to assist the operator in easily locating flower stem 31 in gap 18.

Normally, the flower stem 31 would fall naturally in the center of stem pick 5 and lie in the V-groove 8. However, as can be appreciated by observing the limitations on space that the knife parts 23, 25 have for shearing the stem 31, if the stem 31 was fully seated in groove 8, the knives would only shear the top, although major, portion of stem 31 and perhaps leave some strands of connected fiber such that the cut end of flower stem 31 would not be completely severed. To solve this problem, knife block 25 is shown offset over the center of V-groove 8, and this limits the location of flower stem 31 forcing it to ride on the raised portion of stem pick 5 such that the blades 23, 25 can fully sever the stem.

As a further aid to insure that no fragment of the flower stem 31 is trapped between the bottoms of the sliding knife parts 23, 25 and the V-groove 8, a protuberance 43 is formed at the bottom of the backup knife 25 and extends a distance into V-groove 8.

The knife parts 23 and 25 are shown in FIG. 5 to extend below the tops of finger tips 44, which is possible because there are no fingers 6 at the cutting location.

In operation, as the jaws 9 are drawn toward one another, the finger tips 44 are cammed upwardly by the curved surfaces 41 of jaws 9 at about the same time that the knife 23 engages the flower stem 31. Accordingly, by the time the fingers 6 are formed about the flower stem 31, knife 23 has already severed the stem 31, and the cut free end of flower stem 31 is then free to move laterally and seek a centered position in V-groove 8, i.e. vertically axially aligned with the axis of the stem pick 5. Thus, the offset axes of flower stem 31 and stem pick 5 as shown in FIG. 5 is a temporary situation, since jaws 9 are symmetrically arranged about the ultimate common axis of the pick 5 and flower stem 31 and force the desired alignment upon completion of the step of attaching the pick.

FIG. 6 shows a stem pick 5 attached to the extremity of flower stem 31 with fingers 6 wrapped thereabout and a fresh cut end 33 of stem 31.

FIG. 7 illustrates a simplistic way of cutting the flower stem underwater. In this case, the entire assembly of FIG. 1 is disposed within a container 51 filled with water 53 to a level to exceed the level of cutting of the stem 31 of the flower. A notch 54 in container 51 is provided for relatively unrestricted insertion of the flower stem into attachment assembly 7, although the level of water 53 would be close to the bottom of notch 54. In this embodiment, an operating lever 55 is bent so as to be fully operable by the operator without interference from the sides of the container 51.

All parts of the machine shown in FIG. 7 should be made of stainless steel, plastic, or other components that are not susceptible to rust or corrosion by the water bath environment. The embodiment of FIG. 7 is shown for the sake of simplicity in setting forth this particular feature of the invention, and it will be understood that various forms of this embodiment would be within the spirit and scope of the invention. That is, a small container (not shown) can hold the cutter assembly 21, or the attachment assembly 7 and cutter assembly 21 combination, separate from the other parts of the stemming machine, taking into consideration water seals, an entrance notch for the flower stem 31, and like considerations.

Figure 8:
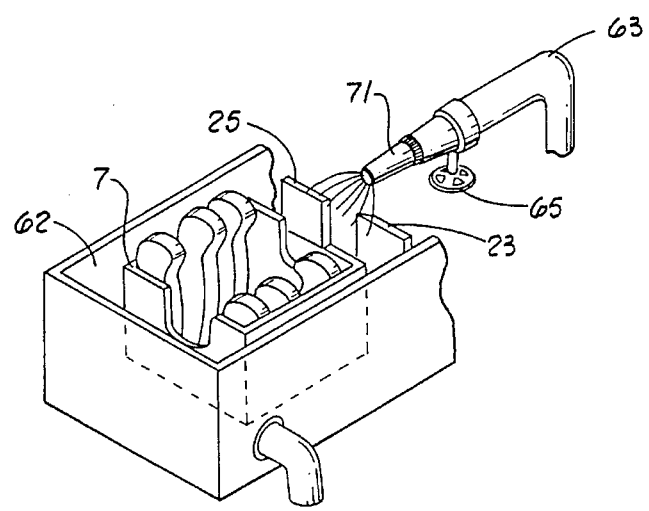
FIG. 8 shows the cutting region of a stemming machine being doused by a flow of fluid from a nozzle.

FIG. 8 is an alternate embodiment of the arrangement of FIG. 7 in which, rather than filling container 51 completely full of water above the level of the cutter knives 23, 25, a stream or flow of water is provided by a nozzle 61 fed by a water line 63, and the assembly is fixed to body 2 by any convenient mounting means 65. In this embodiment, a drain 68 with an attached run-off tube 70 carries the water to a filter and recycling pump, if desired for minimizing the environmental impact. In this embodiment, container 51 is simply a collector vessel and may be quite shallow.

FIG. 9 is similar to that of FIG. 8 with the exception that, rather than a flow nozzle 61 as in FIG. 8, a spray nozzle 71 is provided to create a highly saturated water environment for the end of the flower stem being cut.

As discussed earlier in this description, instead of water, other materials could be used for displacing the air about the end of the flower stem being cut, including materials or additives that incorporate a floral preservative, nutrient, or bacteria stat, or any other growing medium.

EMBODIMENT OF FIGURES 10–14

FIGS. 10–14 show the inner structure of the basic stemming machine 1 as well as an optional side cutter for attachment to an existing manually operated stemming machine, the side cutter being provided to cut a flower stem as part of the cycle of operation of the basic stemming machine. It will be understood that, in the description of FIGS. 10–14, the internal parts of the stemming machine 1 are shown rather schematically, i.e. not necessarily in optimum form or to scale, in order to indicate the function of the various components, and, while operational as shown, a production model of the machine would have many additional and/or alternative parts to perform the same functions, all within the skill of the person familiar with this type of machinery.

Figure 10:
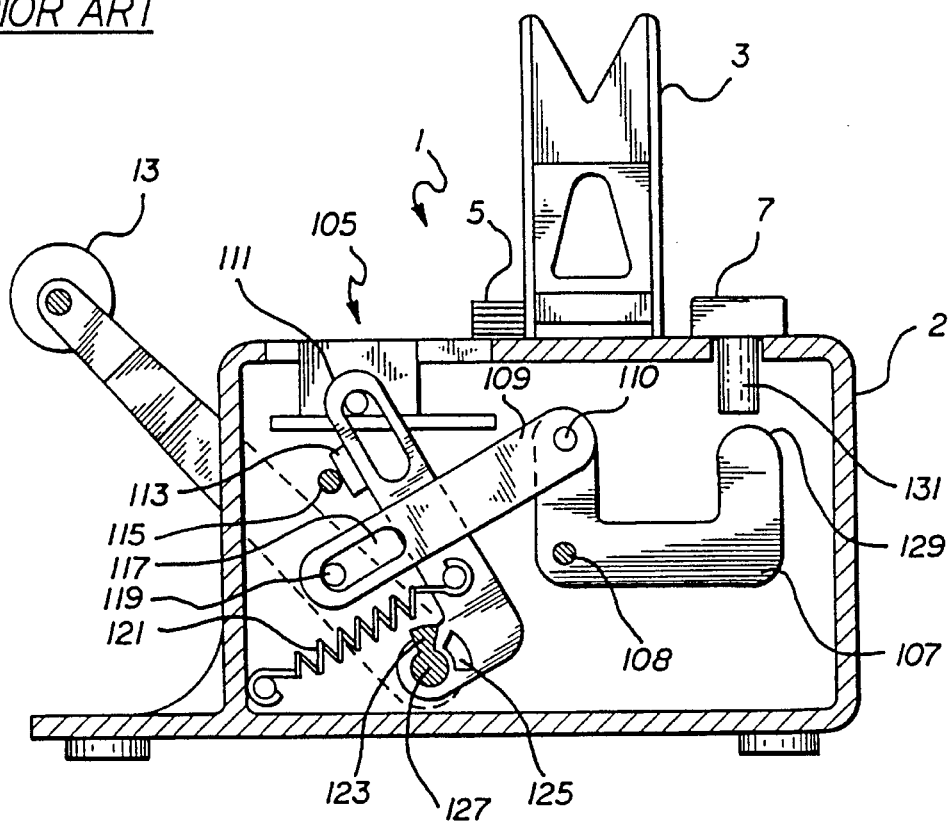
FIG. 10 is a partial cross sectional view of the inner workings of a basic flower stemming machine known from the prior art.

FIG. 10 shows the stemming machine 1 in a standby condition, i.e. in a rest position. In the rest position, the pick positioner 105 is in a condition to feed a stem pick 5 from the stem pick stacker 3, and stem pick attachment assembly 7 has its jaws open (see FIG. 1).

Handle 13 is fixed to an operating shaft 127 which rotates with the handle 13. Fixed to operating shaft 127 is an active dog 123. Rotatable on shaft 127 is an arm 111 which has affixed thereto a passive dog 125 which is moved by the active dog 123 upon rotation of the handle 13 clockwise as seen in FIG. 10. Upon release of handle 13 or movement to the left, passive dog 125 is permitted to return in a counterclockwise position under the influence of the tension of spring 121. Arm 111 has a rubber cushion 113 fixed thereto, and, when arm 111 is permitted to return to a counterclockwise position, cushion 113 ceases movement upon contact with stop 115 which is fixed relative to housing 2. Thus, as handle 13 is rotated clockwise, dogs 123 and 125 cause rotation of arm 111 clockwise, and upon returning of handle 13 to the rest, or lower, position arm 111 comes to rest with cushion 113 resting against stop 115. In the basic stemming machine operation, movement of handle 13 clockwise causes pick positioner 105 to force the bottom stem pick 5 to progress to the right along the top surface of housing 2 and in a position so as to have its fingers 6 (FIG. 2) crimped by stem pick attachment assembly 7.

Figure 11:
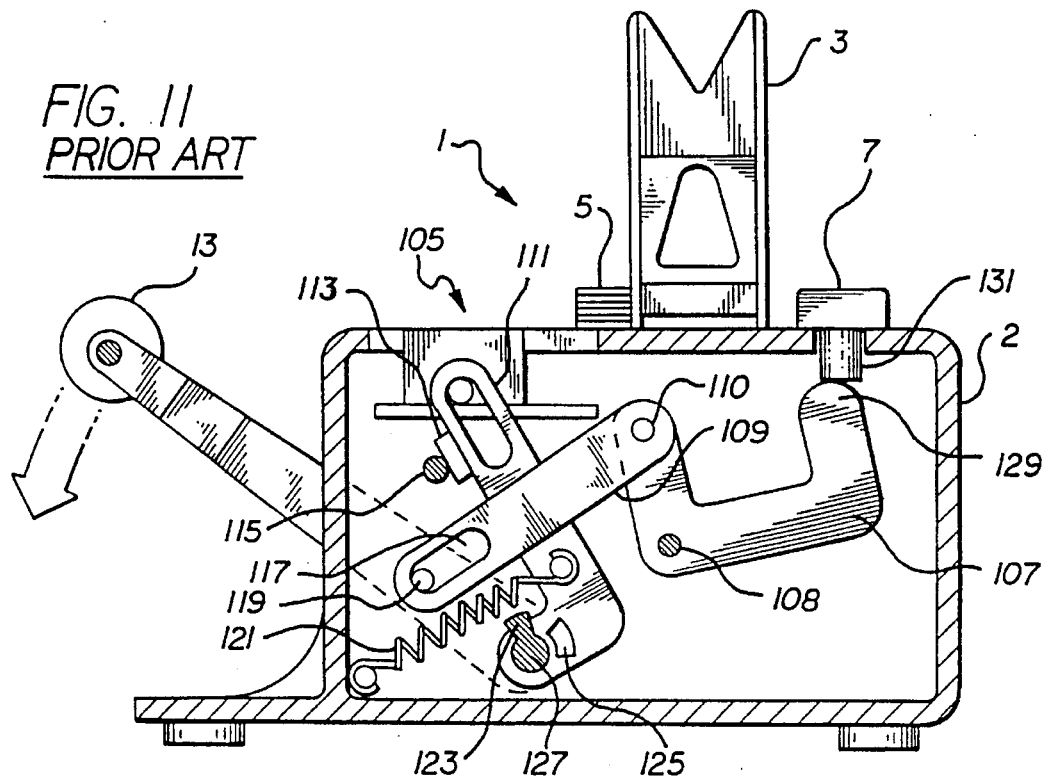
FIG. 11 shows the stemming machine of FIG. 10 in a condition that a flower pick is being crimped about a flower stem.

After handle 13 has moved so as to position a stem pick 5 into attachment assembly 7, it is returned back to the rest position and then continues to be pushed downwardly (counterclockwise) to pull link 109 to the left under the influence of operating pin, causing crimp actuator 107 to pivot about fixed pivot point 108, fixed relative to housing 2, and forcing nose 129 to push upwardly against wedge 131 and operate the stem pick attachment assembly to close the jaws 9 as previously described. Handle 13 has no effect upon the rotation of crimp actuator 107 about pivot 108 in the pick positioning mode (handle movement clockwise), due to the provision of a slot 117 in link 109 and an operating pin 119 fixed to handle 13. Thus, when a new pick 5 is placed into position in assembly 7 by clockwise movement of handle 13, pin 119 simply slides to the right within slot 117, and crimp actuator 107 remains idle. However, upon a counterclockwise movement of handle 13, pin 119 engages the left end of slot 117, thereby pulling link 109 to the left and downwardly as shown in FIG. 11, and rotating crimp actuator 107 about fixed pivot point 108, as actuator 107 rotates relative to link 109 by the relative rotational movement provided by linkage pin 110.

It is presumed that handle 13 has been rotated clockwise to position a fresh stem pick 5 into proper attachment position within stem pick attachment assembly 7, and a flower stem has been axially aligned with stem pick 5 and laid thereagainst as shown in FIG. 1. At this point in the stemming process, handle 13 is moved counterclockwise as shown in FIG. 11 which, as previously described, causes crimp actuator 107 to push against wedge 131 by the action of pin 119 on link 109. In this position (of FIG. 11), active dog 123 is moved away from passive dog 125 due to cushion 113 resting against stop 115. Thus, movement of handle 13 to the left of its rest position does not cause further movement of the pick positioner 105, as is desired. When another pick 5 is to be placed in an attachment position, clockwise rotation of handle 13 engages dogs 123 and 125 to cause movement of pick positioner 105 clockwise to perform the stem pick positioning function.

Figures 12, 13:
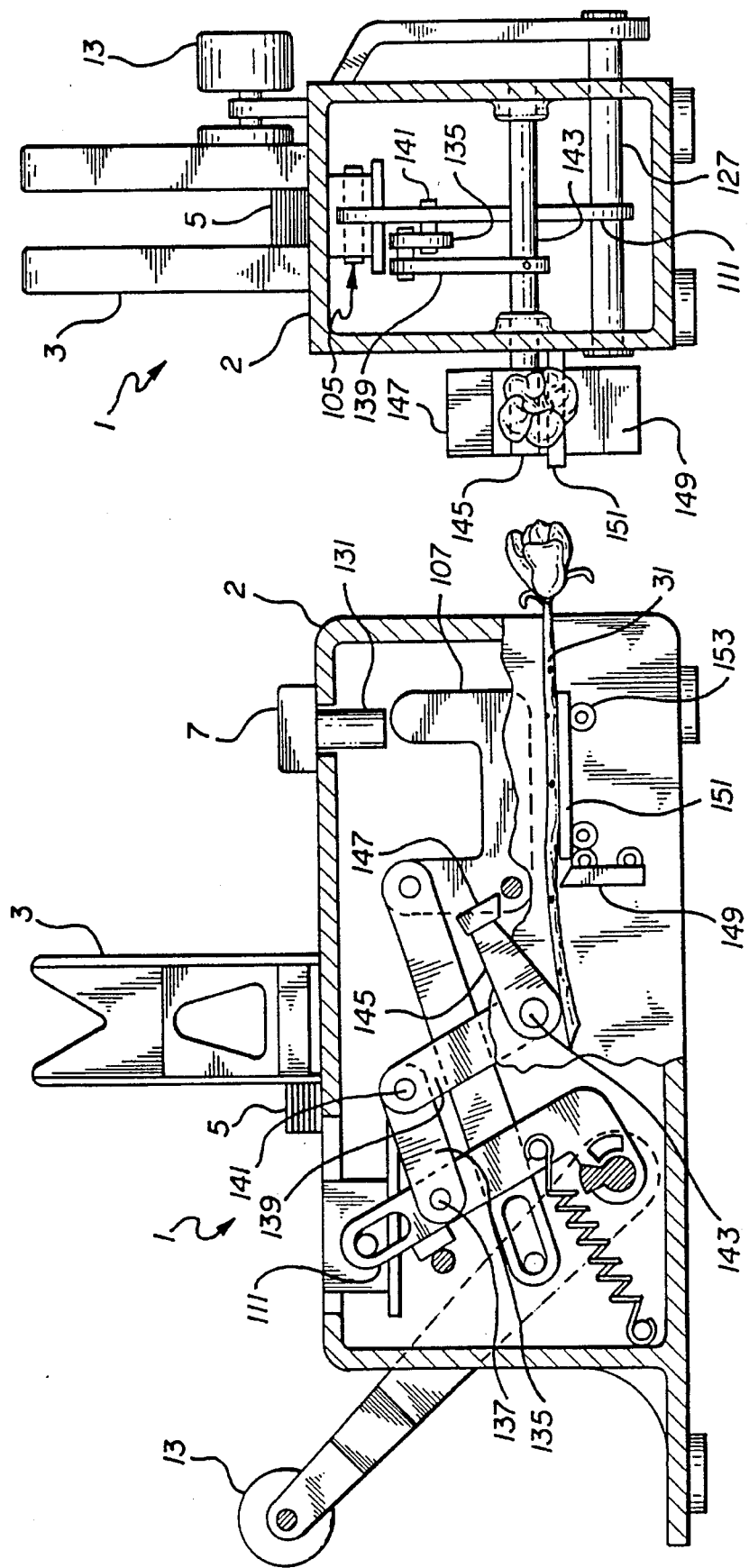
FIG. 12 is a side view of an improved version of the basic flower stemming machine of FIG. 10 with the addition of a side cutter arrangement in accordance with the present invention.
FIG. 13 is a partial cross sectional right end view of the machine of FIG. 12.
Figure 14:
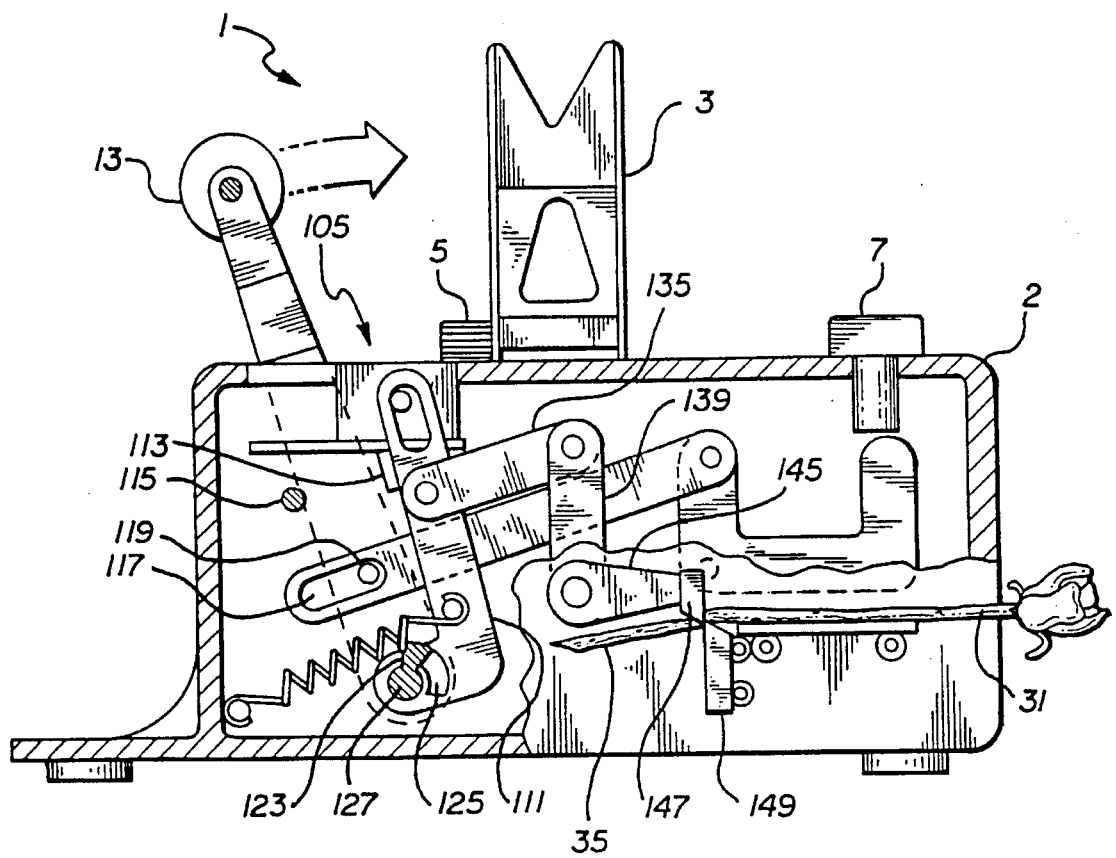
FIG. 14 is a view similar to that of FIG. 12 with the cutter in a position to slice the stem of a flower.

FIGS. 12–14 show the additional elements required to add a stem cutting function to the stem picking machine 1. FIGS. 12 and 13 show a flying knife 147 in a standby or rest position, and FIG. 14 shows the knife 147 having sliced through the stem 31 of a flower.

In FIG. 12, a knife shaft 143 is journalled in housing 2 for rotation of a rotatable knife holder 145 at the end of which is flying knife 147. A knife lever 139 is fixed to knife shaft 143 so that rotational movement of knife lever 139 causes shaft 143 and, in turn, flying knife 147, to rotate about shaft 143. A knife linkage 135 connects arm 111 to knife lever 139 by means of pivot shafts 137 and 141. In this manner, when handle 13 is in its rest position, knife lever 131 is pulled counterclockwise until cushion 113 abuts against stop 115, at which point flying knife 147 is well above the stem of a flower to be cut.

Next, a fresh flower is placed with its stem supported by a cutting shelf 151 mounted to housing 2 by mounting tabs 153. When handle 13 is rotated clockwise to position another stem pick 5 into crimping position within assembly 7, active dog 123 forces passive dog 125 to rotate arm 111 clockwise. This causes pick positioner 105 to push the bottom pick 5 of the stack of picks to the right, and substantially simultaneously move knife linkage 135 to the right, thereby rotating knife lever 139, shaft 143, and flying knife 147 clockwise. This moves knife 147 against the cutting edge of a stationary knife 149, and the flower stem 31 is thereby cut, and the cut free end 35 of the flower stem falls downwardly to a debris box (not shown) to be later disposed of.

CUTTER EMBODIMENTS OF FIGS. 15A–15J

FIGS. 15A–15J depict various cutters that can be used with the apparatuses shown in FIGS. 12–14. Each of the embodiments shown in FIGS. 15A–15J have a flying knife 147 fixed to the end of a rotatable knife holder 145. In the various embodiments, the knife 147 is shown in different configurations, and the stationary part of the cutter is shown as either a block 150 or a second knife cutting element 149.

Figure 15A:
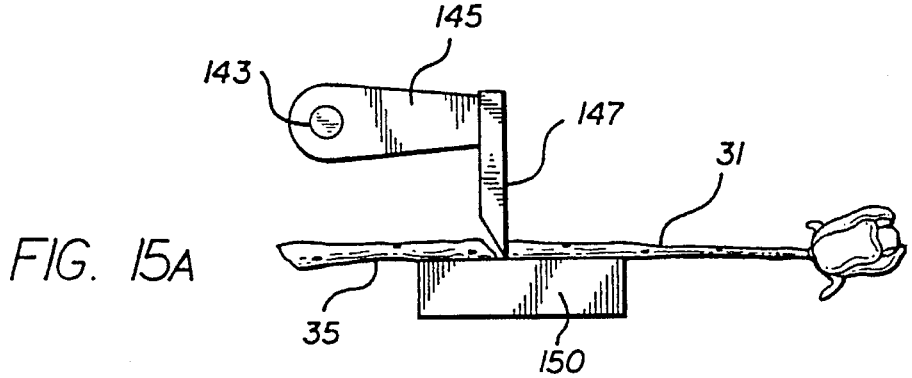
FIGS. 15A–15J illustrate various combinations of knives and knife blocks used with the flower stemming machine of the present invention.
Figure 15B:
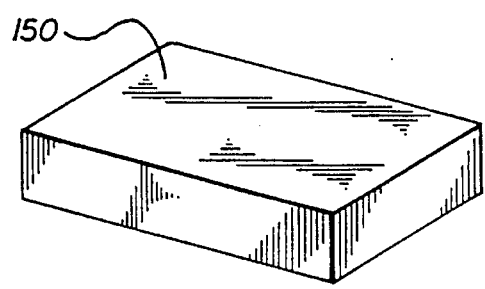

In FIG. 15A, knife 147 cuts the flower stem 31 by pinching it against the top surface of a steel block 150 shown in perspective in FIG. 15B. FIG. 15C illustrates a block 150 having a V-groove 152 in which the flower stem is laid, and knife 147 cuts the stem in a scissors action relative to the edge of block 150. FIG. 15D shows a perspective view of the block in FIG. 15C.

Figure 15E:
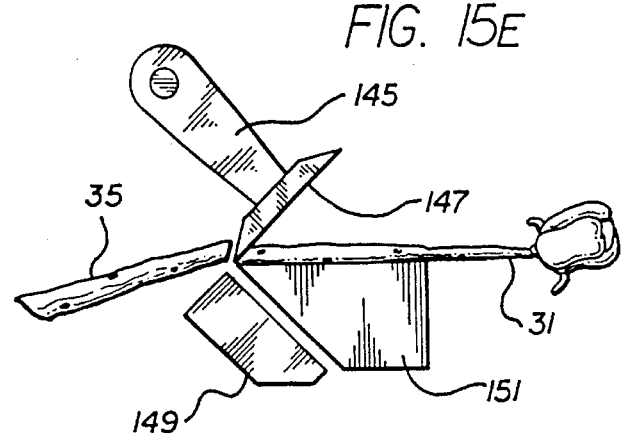
Figure 15J:
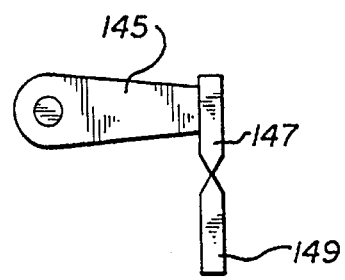
Figure 15C:
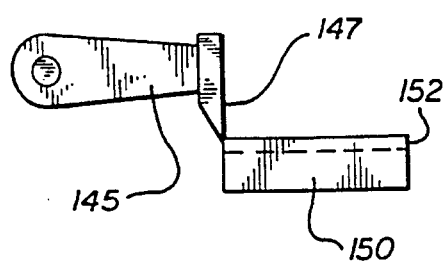
Figure 15D:
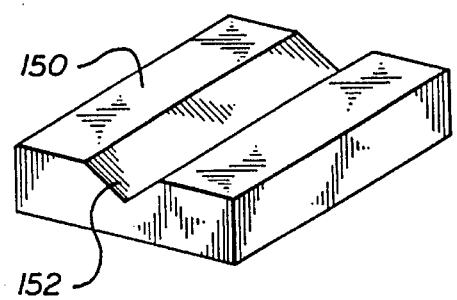
Figure 15F:
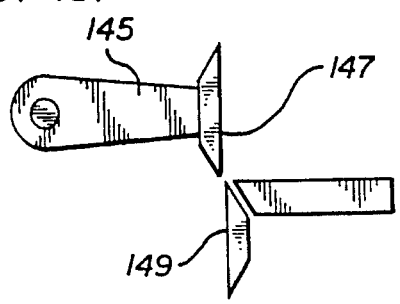
Figure 15G:
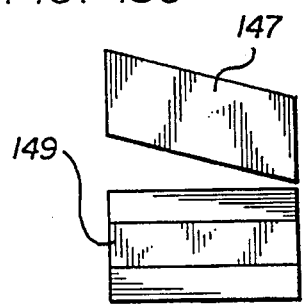
Figure 15I:
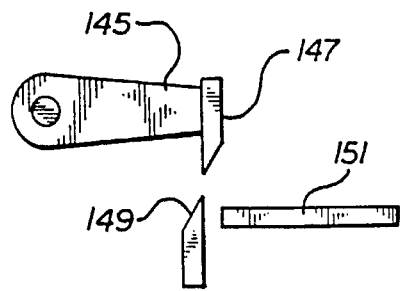
Figure 15H:
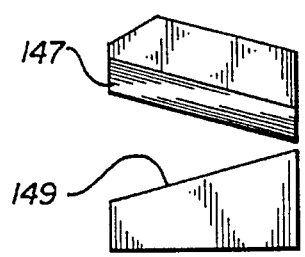

In FIG. 15E, knife 147 is shown as a reversible double-edged knife which slices through the flower stem 31 at an angle, and a stationary knife 149 is also angularly positioned beneath the flower stem. This requires a support bed 151 upon which the flower stem rests to have a pointed end adjacent the knife cutting edges of knives 147 and 149. FIG. 15F is similar to the arrangement of FIG. 15C except that the block 150 has been replaced by a second stationary knife 149. FIG. 15G illustrates a stationary knife 149 having a horizontal cutting surface while the flying knife blade 147 is beveled to provide a slicing action through the flower stem. FIG. 15I is similar to the arrangement of FIG. 15F except that the crossing knife surfaces of knives 147 and 149 are internal to knife 147 instead of external thereto as shown in previous figures. FIG. 15H shows both the bottom stationary knife 149 and the flying knife 147 having beveled edges to increase the slicing action in the cutting function. FIG. 15J shows yet another variation in which the top and bottom knives 147,149 meet to pinch off the flower stem in the middle of the contacting cutting edges of the knives.

EMBODIMENTS OF FIGS. 16A AND 16B

FIGS. 16A and 16B illustrate an improvement over the previously described side cutting arrangements, the cutter of FIGS. 16A and B effecting the cut of the flower stems below water or any other fluid substance 93 which is desired to be contained within container 91. As best seen in FIG. 16B, the lower stationary knife 87 is cantilevered from a mounting position above container 91, the stationary cutting block being mounted to housing 2 by a pair of screws 89. This arrangement allows the lower cutting knife 87 to be submerged beneath the surface of the liquid 93 while not subjecting the knife actuator parts to the fluid. The flying knife assembly 83 is comprised of a replaceable knife 86 secured to a knife holder 85 by means of a screw 88, the knife holder being fixed to and rotated by knife shaft 84. In this arrangement, the support bed 99 for holding the flower stem 31 preparatory to cutting is slanted at about a 30 degree angle from the horizontal, and a scale 101 is provided so as to visually gauge the length of the stem to be cut. Thus, the lower stationary knife 87 can be submerged below the water level, while flying knife 86, in its rest position, is above the water level, as is the knife shaft 84, so as to protect the inside of the flower stemming machine from water inadvertently passing into housing 2 through the bearing for shaft 84.

Container 91 may be mounted to housing 2 by any convenient mounting device, and FIGS. 16A and 16B show a pair of spaced angle bars 95, 97 provided for that purpose. The inner side of container 91 is bent to an inverted U shape with the middle part 98 of the innermost flange missing, so that the container can be moved to the right as seen in FIG. 16A until the flanged portion on the left top side of container 91 is positioned over the space between bars 95, 97, at which point the container may be lowered and removed for easy cleaning and refilling. The top flange of container 91 or the top of bars 95, 97 may have cooperating detents (not shown) in order to positively locate the container at the proper position along bars 95, 97. In such a case, a slight upward lifting of container 91 prior to sliding to the right (in FIG. 16A) will overcome the resistance offered by the detent.

After the flower stem is cut, the cut-off portions 35 of the stems 31 fall to the bottom of container 91 and are removed when the container 91 is removed for cleaning and refreshment of the fluid 93. As the volume increases due to the cutting off of flower stems accumulating in the bottom of container 91, overflow may occur, and an overflow container 103 is provided for that purpose.

EMBODIMENT OF FIGS. 17–20

Figure 19:
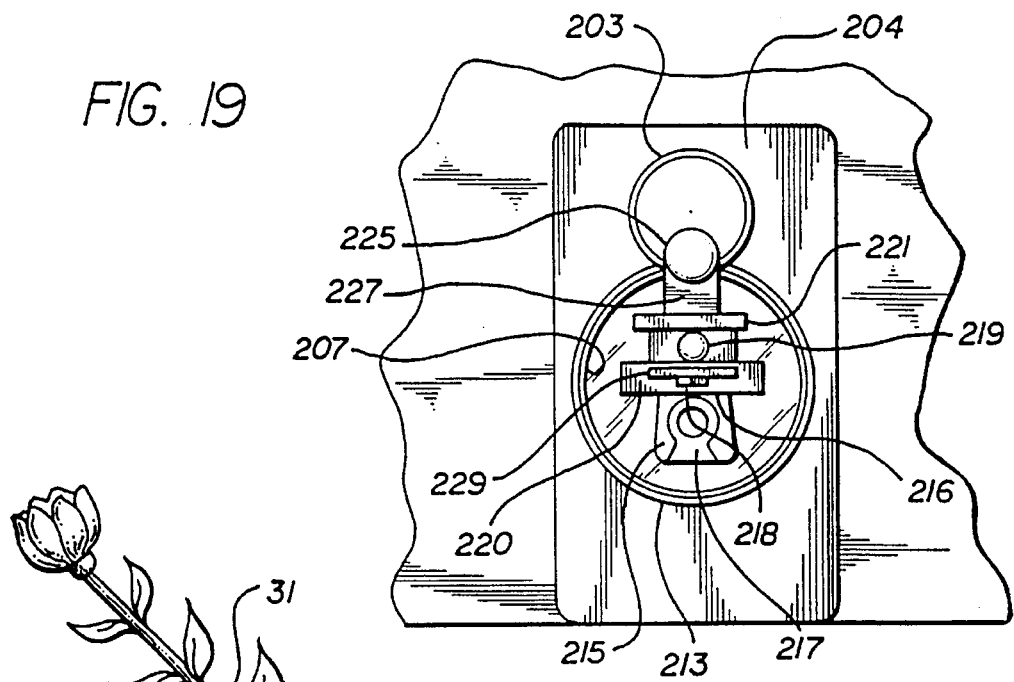
FIG. 19 is a top plan view of the flower stem cutter of FIG. 17.
Figure 20:
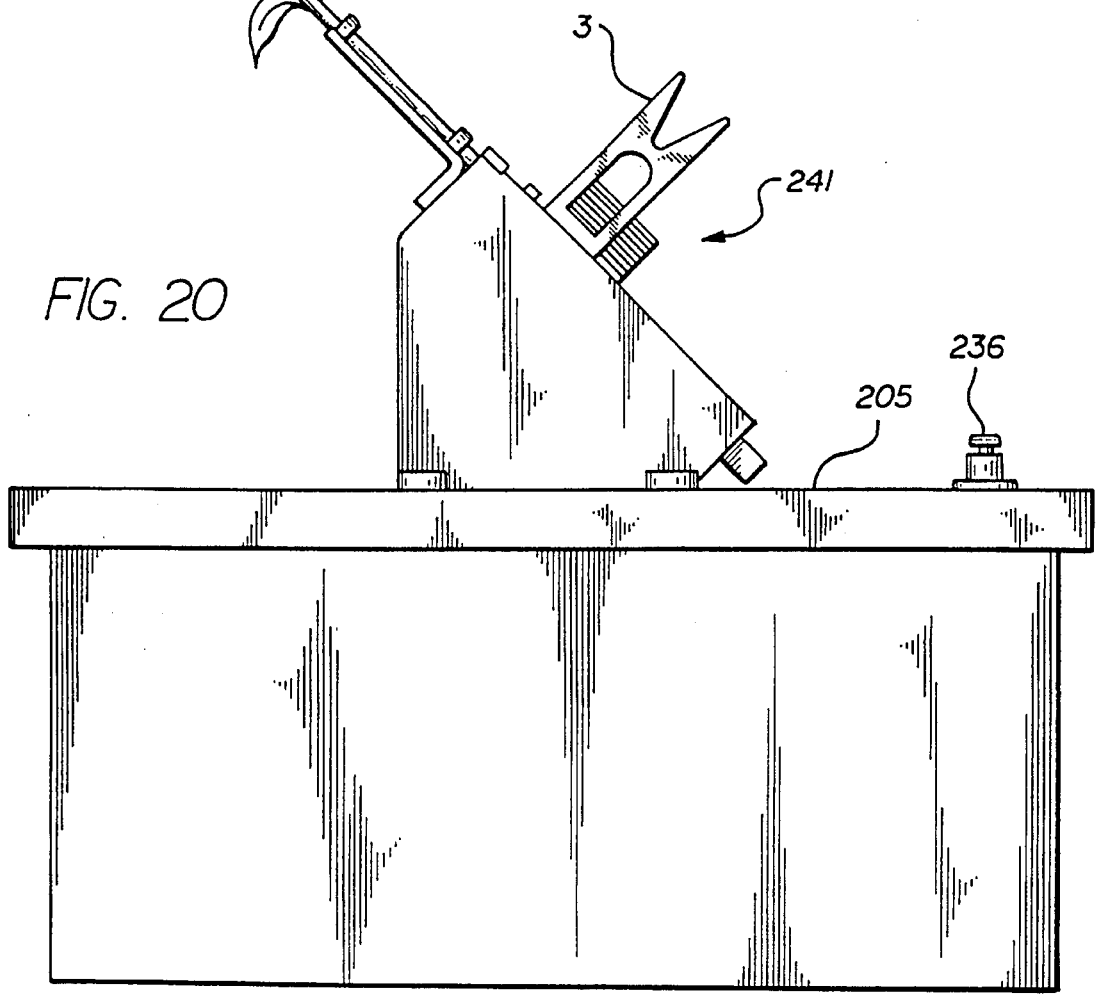
FIG. 20 is a modified flower stemming machine with the working surface inclined at about a 45 degree angle.

FIGS. 17–20 show a further embodiment in which the flower stem 31 is cut with the flower stem vertically oriented, and the stem pick is applied while the flower stem is at an angle of about 45 degrees from the horizontal. This type of cutting apparatus is ideal when flower stems are to be cut in one operation and a pick is applied in a separate operation. FIGS. 17–19 show the stem cutting arrangement, and FIG. 20 illustrates the angled version of the stem picking applicator which may be manually operated or automatically operated by appropriate electromechanical devices described hereinafter.

The stem cutter 201 is mounted on a bench 205 by base 204 having a mounting tube 203 extending upwardly therefrom. A container shelf 209 integral with a slotted ring 208 is rotatably mounted on mounting tube 203 and is limited in its rotational extension by means of boss 212 engaging the extremities of a one-quarter annular slot 210. A tab 211 is located at the front of shelf 209, and an operator can rotate shelf 209 by grasping tab 211 and turning it to the right 90 degrees or back to its position shown in FIG. 17. In this way, the shelf 209 is rotated away from container 207 so that the container can be lowered and easily and quickly removed from the assembly for cleaning and refilling. After refilling, the container 207 is raised up through an annular container holder 213 mounted to tube 203, and the operator holds container 207 while rotating tab 211 back to its position underneath the container. This arrangement permits removal, cleaning, and refreshment of the fluid in container 207 in less than a minute.

Mounted at the top of tube 203 is the cutter arrangement itself which comprises a stationary blade 217 fixed in relation to tube 203 and a slicing blade 215 which rotates with respect to stationary blade 217 about a-cutter shaft 219 journalled in bearings 223. An actuator 225 is energized by pushing "cut" button 235, and cutter shaft 219 rotates sharply through a motion coupler 227 of any known type. For example, actuator 225 can be a "step- and-return" motor, and motion coupler 227 may be a belt coupling the actuator 225 to cutter shaft 219. All of the elements of the cutter are mounted to tube 203 by means of a cutter support 221.

In operation, the operator selects a flower and pushes its stem 31 down through a stem guide opening 233 which is formed in a cap 231 closing off the top of container 207 except for the stem guide opening. The operator moves the blossom on the flower to its elected measurement indication on ruler 229 and pushes the "cut" button 235. Alternatively the "cut" button may be a microswitch slidably mounted (e.g. by spring friction) on or adjacent ruler 229, the microswitch 216 having a finger actuator 220 provided for convenient actuation by the operator's hand (finger). A pointer 218 is provided for purposes of setting the slidable microswitch 216 to a desired position. With minimal experience, a correlation between the pointer setting against ruler 229 relative to the desired stem length and the operator's hand position relative to the bloom will quickly be established to effect repeatedly predictable stem lengths. The cut portion of the stem falls downwardly and cut stems are accumulated in the bottom of container 207 until later removed when the container is emptied and refreshed.

The slicing blade 215 may be tapered to have an inwardly directed cutting edge best seen in FIG. 18. Since the cutting edge of knife 215 surrounds the flower stem 31, actuator 225 may be alternately energized to move slicing blade 215 in one direction for cutting a flower stem and then in the opposite direction for the next flower stem to be cut. This will extend the life of the knife by a factor of two so that it will not have to be changed as often as would a single edged knife blade.

The stem picking applicator shown in FIG. 20 is constructed, from a functional viewpoint, the same as that shown in FIG. 1. The advantage of the embodiment FIG. 20 is that, having cut the flower stem in a vertical direction, the operator places the flower stem at a 45 degree angle on the stem pick applicator 241 while maintaining a substantially vertical component to the orientation of the flower stem with the free end always directed downwardly. The operator then presses a button 236 to crimp a pick about the flower stem. As explained earlier, it is important to keep fluid at the cut portion of the flower stem during cutting and immediately thereafter. By cutting the flower stem in a vertical direction, the fluid running down the side of the flower stem will accumulate at the bottom and maintain a supply of fluid for entry into the vascular tissue of the cut flower stem even during the short time required for stem pick application. The completed stemmed flower is then quickly inserted into the flower arrangement, and the cut portion of the flower stem is not exposed to air in the entire process.

From FIGS. 17 and 18, it can be appreciated that this embodiment of the invention offers the advantage of a minimum volume fluid chamber, as compared, for example to the tray type reservoir of FIGS. 16A and 16B.

EMBODIMENT OF FIGS. 21–27

In the description of all previous embodiments of the stem picking machine 1, operation of the machine has been effected by manually manipulating a handle 13. The aspect of the invention depicted in FIGS. 21–27 provides an automatic operation of the stem picking machine and permits the operator to cut the flower stem, crimp a previously fed pick onto the stem of a previously cut flower stem, feed the next pick into position, and eject the previously crimped pick, all automatically.

Figure 21:
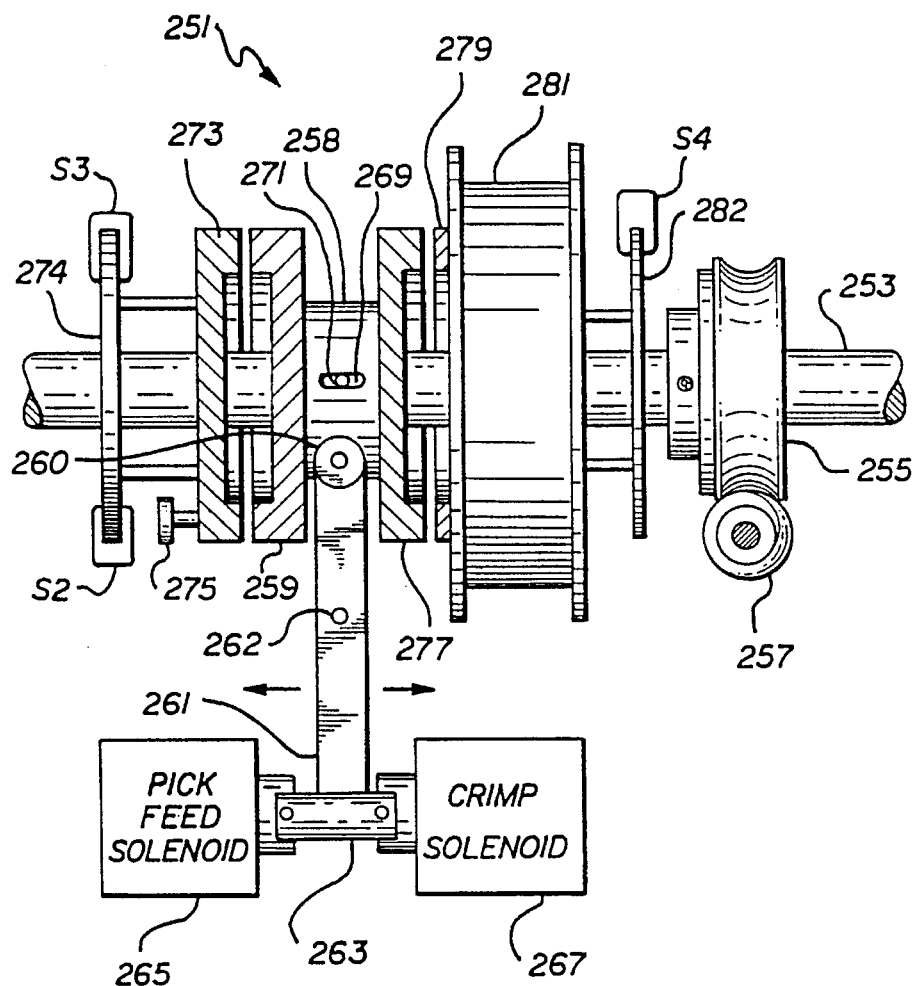
FIG. 21 is a transmission for use in automating a flower stemming machine, in accordance with the present invention.

The main operating unit for such automatic mechanism is the transmission 251 shown in FIG. 21. It comprises a drive shaft 253 driven by a drive shaft gear 255 whose outer gear teeth mesh with those of a worm gear 257 driven by a motor 301 (FIG. 26). As drive shaft 253 rotates continuously (i.e. as long as the motor is energized), it rotates clutch 258 by means of a pin 271 fixed to drive shaft 253 and extending through a slot 269 in the hub of clutch 258. Clutch 258 is therefore slidable, to a limited extent, axially along drive shaft 253, while all of the other elements of the transmission 251 are freely rotatable on drive shaft 253 but are restricted from axial movement.

Clutch 258 includes a crimp timing clutch plate 259 on the left side of FIG. 21 and a pick feed clutch plate 277 on the right side. Thus, as clutch 258 is moved left or right along drive shaft 253, crimp timing wheel 273 or pick feed clutch wheel 279 is engaged, respectively and caused to rotate along with clutch 258.

Clutch 258 is moved left or right, in FIG. 21, by the pressure from a contact roller 260 rotatable at the end of a clutch rod 261. Clutch rod 261 is pivotable about fixed pin 262, so that movement of the bottom of rod 261 to the right moves the top of rod 261 to the left, and vice versa. The lower end of clutch rod 261 is moved right or left, in FIG. 21, by the action of a pair of opposing solenoid actuators independently pulling clutch rod coupler 263 to the right by crimp solenoid 267 or to the left by pick feed solenoid 265, respectively.

The clutch engagement between plate 259 and crimp timing wheel 273 and between plate 277 and pick feed clutch wheel 279 may be made by any appropriate clutch design, and preferably by positively engagable (non-slipping) elements (not shown).

As crimp timing wheel 273 rotates clockwise, it moves roller 275, positioned at the bottom of wheel 273, used to actuate the crimp jaws 9 of the stem pick attachment assembly 7 (FIG. 1). Moreover, as crimp timing wheel 273 rotates clockwise, crimp timing cam 274, being mechanically coupled to wheel 273, also rotates clockwise and selectively operates microswitches S3 and S2. Similarly, as pick feed wheel 281 rotates, pick feed cam 282, mechanically coupled to wheel 281, also rotates and selectively operates microswitch S4. The functioning of roller 275 and switches S2–S4 will be explained with reference to FIGS. 22–26.

Figure 22:
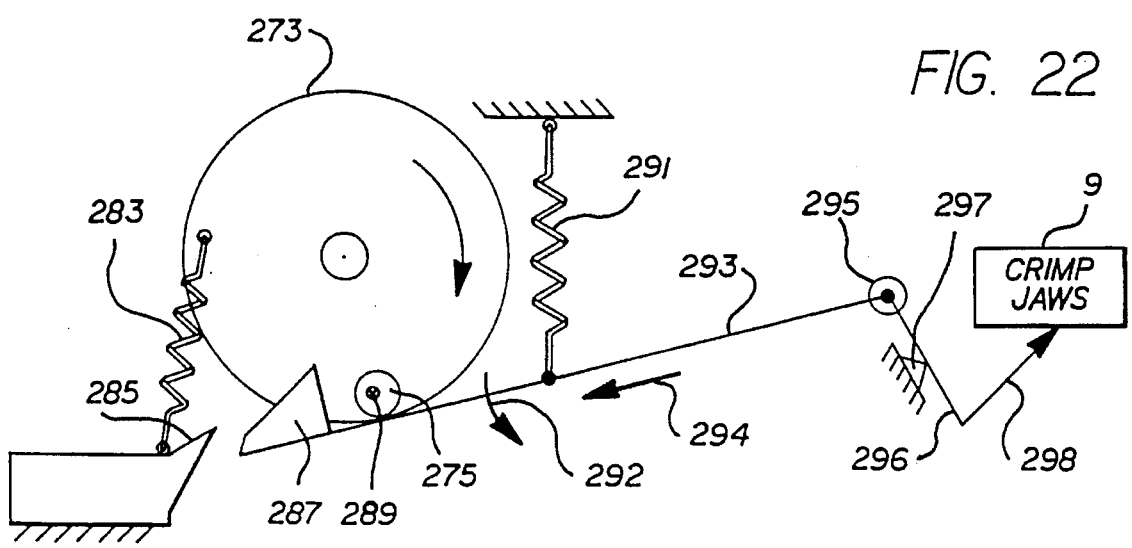
FIG. 22 is a schematic representation of the operation of the transmission's crimp timing wheel and its associated mechanical elements.

FIG. 22 is a schematic representation of the operation of the crimping jaws 9 as crimp timing wheel 273 rotates. Crimp timing wheel 273 is shown at a rest position in FIG. 22 and is turned clockwise when actuated by clutch 258. A return spring 283 is fixed to the framework of the apparatus so as to return wheel 273 to its rest position after the crimp jaws 9 crimp a stem pick about the flower stem. Bias spring 291 pulls crimp pull rod 293 against roller 275 (also seen in FIG. 21). Pull rod 293 essentially replaces link 109 shown in the manually operated version of the apparatus in FIG. 10.

As crimp timing wheel 273 rotates clockwise, roller 275 engages wedge 287 and moves it to the left which moves crimp pull rod 293 also to the left (arrow 294), the right end of pull rod 293 being rotatably attached to a pivot connection 295. As pull rod 293 and pivot connection 295 move to the left, crimp actuator 296, 297 pivots about a fulcrum 297 to operate the crimp jaws in a manner similar to that of crimp actuator 107 engaging wedge 131 as described in connection with FIG. 11. It will be appreciated that FIG. 22 is only a schematic representation, and a person of ordinary skill in the art can easily adapt the movement of crimp pull rod 293 to replace the link 109 and push rod 298 to replace crimp actuator 107 of the manual version of the apparatus (FIGS. 10–14).

To account for manufacturing tolerances and other considerations, a means for adjusting the timing of engagement of roller 275 with wedge 287 is provided by an adjustment 289 shown as an eccentrically positioned mounting screw which permits roller 275 to be fixed to timing wheel 273 at different circumferential positions to engage, earlier or later, wedge 287. Other known adjustment mechanisms could be utilized if desired.

It can be appreciated that strong forces are required to cause crimp jaws 9 to crimp the stem pick around the flower stem. As a safety precaution, a stop 285 is provided to prevent wedge 287 to continue applying crimping forces to jaws 9 after the crimp has been made. Thus, when wedge 287 reaches a predetermined position to the left, in FIG. 22, wedge 287 engages stop 285 and is cammed by such engagement downwardly against the bias of spring 291. Pull rod 293 then pivots as shown by arrow 292 about connection 295. Roller 275 will then pass over the tip of wedge 287 to relieve the leftwardly directed force to wedge 287. At the end of the crimping sequence, as explained later, crimp timing wheel 273 is uncoupled from clutch 258, and return spring 283 is active to return wheel 273 to its rest position.

FIG. 23 is a schematic side view of pick feed wheel 281 showing a wide band coiled steel spring 284 wound about its periphery and anchored to wheel 281 at 288. Wheel 281 is shown in its rest position prior to actuation by clutch 258. When pick feed solenoid 265 is actuated, contact roller 260 (FIG. 21) engages clutch 258 with pick feed clutch wheel 279, thereby rotating pick feed wheel 281 clockwise as shown in FIG. 23. This clockwise movement causes coil steel spring 284 to extend to the right in FIG. 23, and appropriate mechanical elements (not shown) are provided to effect movement of a stem pick into position for crimping, similar to the action of pick positioner 105 shown in FIGS. 10–14. That is, pick feed wheel 281 and spring 284 replaces the pick positioner 105 described in connection with the manual embodiment of the invention (FIGS. 10–14).

The operation of the automatic cutting and stemming apparatus will now be described with reference to FIGS. 24–27. It will be presumed that the automatic stemming of flowers is being performed, and a complete cycle of operation will be described. Alternatively, a first flower stem can be manually cut and placed in a crimping position on the machine, ready for crimping, and the cycle to be described below continues from that point.

A main switch S1, normally open, is thrown to its closed position to provide electrical power (+V) to the electronic components of the circuit shown in FIG. 26. As seen in FIG. 26, a motor 301 is energized, and this motor turns worm gear 257 shown in FIG. 21. If desired, motor M may be turned on by circuitry (not shown) which applies power to motor M only during a complete cycle of the apparatus, the motor being deenergized between cycles to conserve energy, extend the life of the motor, and increase the safety factor of the apparatus.

With a flower stem in position for stemming, i.e. lying on a stem pick placed between jaws 9 of attachment assembly 7, the operator places a second flower whose stem is to be cut into a cutting position, and either the operator manually touches a start switch S5 (see FIGS. 26 and 27), or switch S5 is automatically operated by the insertion of a flower stem to be cut, S5 preferably being a microswitch which is automatically actuated by the tip of the flower stem upon insertion into the cutting area or manually by the operator's hand. The automatic actuation of switch S5 by the flower stem itself is useful for cutting off flower stems where the length to be cut off is the same for all flowers, while the manually operated version of switch S5 would be preferred when the lengths to be cut off vary.

Figure 27:
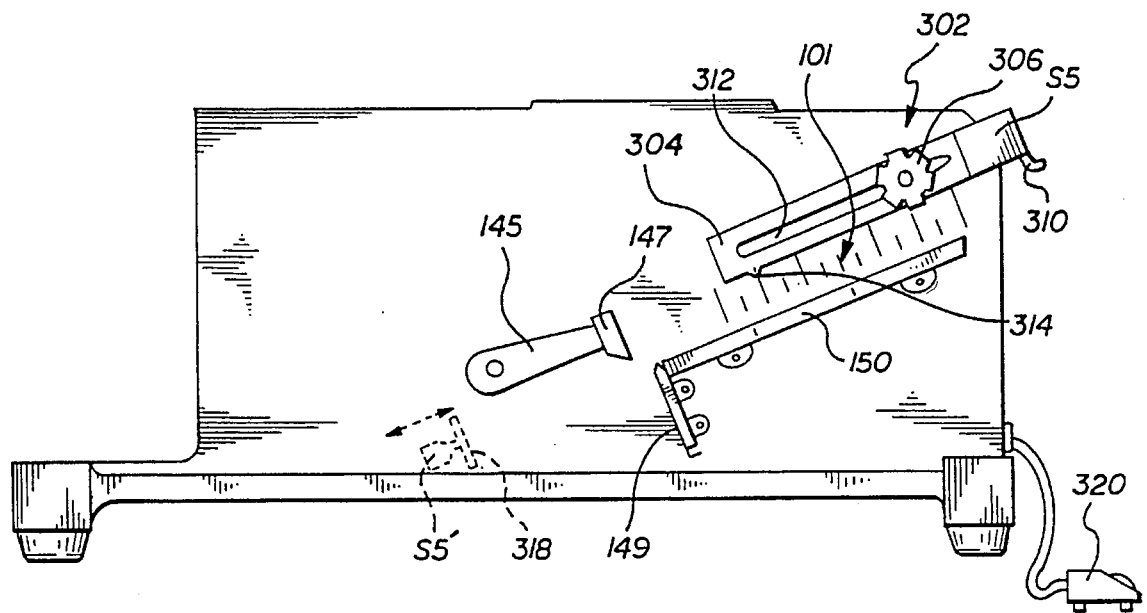
FIG. 27 illustrates two possible implementations of a "cut" switch, operational in the schematic of FIG. of 26.

Switch S5 is shown in FIG. 26 as comprising two sets of contacts S5a and S5b. It is physically shown in position relative to the cutter arrangement in FIG. 27. FIG. 27 shows two possible locations for switch S5. First, in solid lines, switch S5 is shown to be activated by the operator applying pressure to a trigger 310 by the operator's hand. This arrangement of switch S5 is preferred when the flower stem is being cut under water, since switch S5 will be positioned fully out of the water. When it is desired to cut the flower stem out of water, an alternative position for switch S5' is shown in phantom in FIG. 27 as S5', whereby switch S5' is a microswitch operated by movement of a contact plate 318 engagable by the end of the flower stem (not shown). In this way, a predetermined length can be removed from each flower stem automatically without the operator having to observe a ruler scale. This would be an ideal arrangement when the flowers to be stemmed are all the same length to begin with, and a fixed length of stem is to be removed. Not shown in FIG. 27, but easily adapted by those skilled in the art, switch S5' can be movable along the axis of the flower stem to adjust the amount of stem portion to be removed. A mechanism of this type is shown as an adjustment assembly 302 for use in the positioning switch S5. In such an arrangement, switch S5 is mounted to a thin slide strip 304 which has an elongated slot 312 therein to accommodate the screw of a knob 306 which tightens against strip 304 to lock it into position. A pointer 314 is provided on strip 304 and slides along a ruler scale 101 so that the length of the flower stem left on the bloom end after cutting is set to a predetermined length. For example, an operator may grasp a flower just beneath the bloom and move the stem of the flower through the cutting area until the operator's hand or finger pushes trigger 310. This will provide repeatedly accurate cutting lengths for the flower without the operator having to visually observe the length along a ruler line.

As an alternative to the switch positions shown in FIG. 27, S5 can be a foot operated pedal switch 320 which may be more convenient where the operator is conducting both the cutting and the picking operations using both hands to manipulate the flowers. This permits the operator to place a flower in position to have its stem cut and attend to the picking operation without having to concentrate on proper positioning of his or her hand while cutting the stem. Despite the various placement possibilities for the "cut" switch, for convenience of discussion, it will be referred to hereinafter as switch S5.

When switch S5 is operated, preferably a pair of contacts S5a and S5b both close momentarily and reopen upon release of the operator's hand or release of the stem pushing against a microswitch arrangement at the tip of the stem. The significance of the two sections of switch S5 will be discussed in connection with FIG. 26.

FIG. 24 shows microswitches S2 and S3 being operated by crimp timing cam 274, and FIG. 25 shows microswitch S4 actuated by pick feed cam 282. Switch S2 is normally open, while switch S4 is normally closed. Switch S3 is normally in the position to apply ground to the bottom of crimp solenoid 267. A relay R has sets of contacts C1, C2, and C3. With relay R inactive, contacts C1 are normally closed, and contacts C2 and C3 are normally open.

Upon closure of cutter switch S5, a path is completed to energize cut solenoid 268 and cut the flower stem by action of switch S5a. At the same time, S5b closes to supply energy to crimp solenoid 267 from the power source +V, through main switch S1, switch S5b, switch S3, and contacts C1. The energization of crimp solenoid 267 engages clutch 258 with crimp timing wheel 273 which begins the before-described operation of FIG. 22 and rotates crimp timing cam 274 clockwise as shown in FIG. 24.

Immediately after crimp timing cam 274 begins to turn in a clockwise direction, switch S2 is closed (see FIG. 24). Thus, switch S5b may be momentarily operated such that immediately after its closure it can be released and returned to its open position, since switch S2, in parallel with switch S5b continues to complete the path to keep crimp solenoid 267 energized.

This condition continues as the stem pick is applied to the stem in attachment assembly 7, as described in connection with FIG. 22, until crimp timing cam 274 moves sufficiently clockwise to toggle switch S3 to the position shown dashed in FIG. 26. This removes ground from crimp solenoid 267 and deenergizes that solenoid. As a result, the clutch 258 releases from crimp timing wheel 273, and return spring 283 returns crimp timing wheel 273 back to its rest position, returning switches S2 and S3 to their normal positions.

In the meantime, when crimp timing cam 274 toggles switch S3, relay R is energized through S3 and the normally closed contacts of switch R4. With relay R energized, contacts C3 close to parallel the closed contacts of switch S3. Since, as described, switch S3 releases power to solenoid 267 and permits crimp timing cam 274 to return to its rest position, S3 immediately retoggles back to its initial position. However, by that time, not only do contacts C3 keep relay R energized, but the opening of contacts C1 continues to keep crimp solenoid 267 from reenergizing as a safety precaution. The status of the various elements at this point in the cycle is that crimp solenoid 267 is back to its rest position, relay R is energized, and the contacts C2 of relay R apply power to pick feed solenoid 265 which then causes engagement of clutch 258 with pick feed clutch wheel 279.

With pick feed solenoid 265 energized, pick feed wheel 281 begins to push another pick into position in attachment assembly 7, and movement of the pick pushes the previously crimped pick out of its position so as to automatically eject that previous pick with the flower stem already crimped within it.

With the rotation of pick feed wheel 281, pick feed cam 282 rotates clockwise as shown FIG. 25 until normally closed switch S4 opens at the end of the pick feed positioning function. Thus, after a new pick has been put into position and the previous one ejected, switch S4 opens and relay R is deenergized to move contacts C1–C3 back to their initial positions. Since the return to rest position for crimp solenoid 267 has already occurred, switch S2 will have been reset to its normally open position, and crimp solenoid 267 remains deenergized. Furthermore, since contacts C2 open, pick feed solenoid 265 is also deenergized.

Thus, the cycle is completed with a new pick in position, ready for crimping, the previously crimped stem pick about a flower stem has been ejected, and the cutter switch S5 is open ready for manual or automatic closure again to restart the cycle.

EMBODIMENT OF FIGS. 28–30

Figure 28:
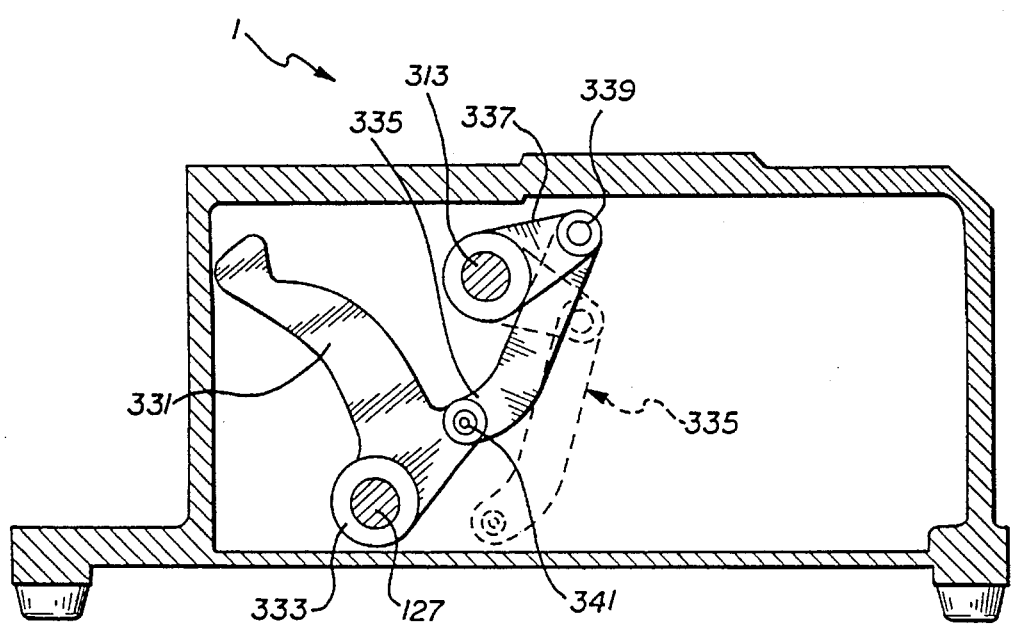
FIG. 28 is a partial internal view of the major components involved in implementing a linear cutter arrangement to replace the rotary cutter arrangement of FIGS. 12–16.

In the embodiments of the invention shown in FIGS. 12–16B, the flying knife 147 has been shown at the end of a rotatable knife holder 145 which pivots about a knife shaft 143. It can be appreciated that knife 147 works against a stationary knife 149 or block 150, and careful alignment of the two knife surfaces must be maintained at all times in order to make a clean cut and yet not have the two knife edges interfering with one another. An improvement over the rotatable flying knife of FIGS. 12–16B is shown in FIGS. 28–30. Here, a rack and gear arrangement is used to provide linear motion to the fly knife.

As seen in FIG. 29, a cutter bed 317 is mounted to the housing 2 of stemming machine 1 at an angle so as to make it convenient for an operator to place a flower stem in position to be cut. At the left lower end of cutter bed 317 is mounted a stationary cutter bar 309 having a cutting edge pointing upwardly. Above cutter bed 317 is a cutter assembly 303 which houses a cutter slide 315 movable within the cutter assembly 303 in a linear fashion near vertical as shown in FIG. 29. At the bottom end of cutter slide 315 is mounted a slide knife 307 which moves linearly as cutter slide 315 moves and cooperates with stationary cutter bar 309 to slice the flower stem being cut. The cutter slide 315 is reciprocated within cutter assembly 303 by a rack and gear arrangement, the rack portion being provided on the left side of cutter slide 315, and the toothed gear portion 311 being mounted on a fixed shaft 313.

The internal components of the stemming machine are modified somewhat from that shown in FIG. 10. In FIG. 28, for example, a push rod rocker arm 331 has a mounting sleeve 333 fixed to operating shaft 127. Rocker arm 331 is configured at its top to engage a pick slide arrangement (not shown) which is somewhat different mechanically, but the same in function, as that of the combination of arm 111 and pick positioner 105 shown in FIG. 10.

In any event, rocker arm 331 corresponds to arm 111 in FIG. 10 and is provided with a pin 341 which pivotally mounts the lower end of stem cutter link 335. The upper end of link 335 is pivotally connected to a crank arm 337 by means of pivot pin 339. The solid lines depicting link 335 and crank arm 337 illustrate these parts at a rest position for the handle 13 (FIG. 10). As the handle 13 rotates clockwise, operating shaft 127 and rocker arm 331 rotate clockwise as well. This movement causes a downward pull on stem cutter link 335 which, in turn, pulls down on crank arm 337 and rotates shaft 313, fixed to crank arm 337, clockwise (the clockwise position depicted by phantom lines in FIG. 28).

As best seen in FIG. 30, this clockwise rotation of shaft 313 rotates a toothed gear 311 at its extremity, shaft 313 being supported by bearing 343 mounted within the housing of cutter assembly 303.

As gear 311 rotates clockwise, cutter slide 315 is moved downwardly due to the rack and gear mechanical linkage. This linear movement of slide 315, in turn, effects a corresponding linear movement of slide knife 307 against the cutting edge of stationary cutter bar 309 to slice through the flower stem in a controlled, repeatable, and predictable manner. Adjustment of the relative position between slide knife 307 and stationary cutter bar 309 is simplified, since the rotational movement of the flying knife arrangement of FIGS. 12–14 has been eliminated. The rack and gear arrangement has many other advantages over the rotatable flying knife configuration, e.g. the former can apply greater pressures to cut stems of greater thickness than with the rotatable flying knife. Furthermore, monitoring and maintaining the relative positions of the cooperating knife edges is much less with a linear configuration, and a better "scissors cut" is possible with sliding knife blade surfaces which can only be provided by the linear knife movement design.

It will be appreciated that, although the design of the embodiment shown in FIGS. 28–30 was explained on the basis of a manually operated handle, just as with the embodiment of FIGS. 10–14, an appropriate automatic electromechanical system, similar to that shown in FIGS. 21–27, can be easily adapted to automatically operate the different functions of the cutter assembly arrangement shown in FIGS. 28–30. Similarly, the embodiment of FIGS. 28–30 is well suited for cutting plant stems under water (or other fluid) by employing a fluid chamber design similar to that shown in FIGS. 16A and 16B.

OPTIONAL FEATURES OF FIGS. 31 AND 32

One important objective in applying a stem pick to the stem of a flower is to avoid damage to the flower stem. Indiscriminate application of a stem pick could cause damage to the flower stem at the crimping position of the pick breaking the surface skin of the stem or crushing it, thereby permitting the inflow of air into the vascular tissue of the plant and interrupting the transpiration stream of water within the xylem. Obviously, excessive pressure of the crimped stem pick about the flower stem will also strangle the plant and reduce the transpiration of water and/or nutrients to the bloom.

Figure 31:
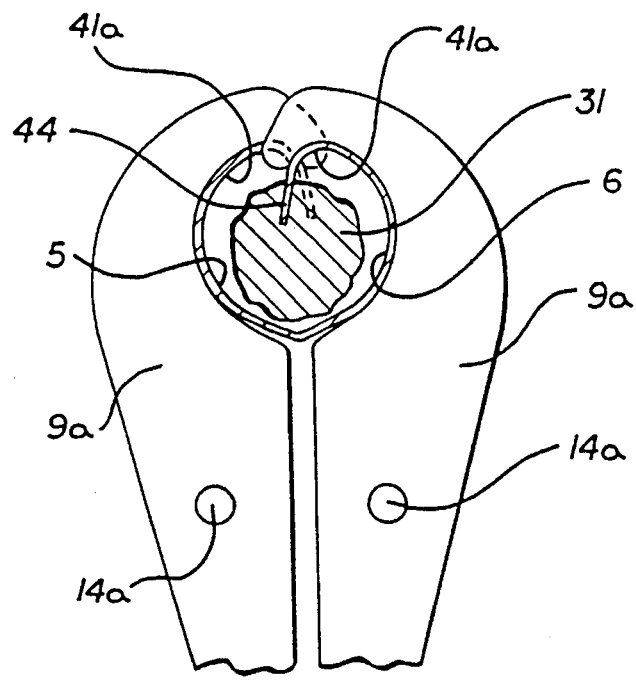
FIG. 31 depicts an alternative shape of the crimping jaws for applying a pick to the stem of a flower.

Two optional features of the present invention serve to more carefully and delicately crimp the stem pick about the flower stem with only minimal pressure and minimum damage to the stem. FIG. 31 illustrates one of those features. In this figure, it will be observed that the opposing jaws 9a have a different geometrical configuration than those seen in the ends of jaws 9 of FIG. 5. In FIG. 5, a tangent line drawn at the exit point of the jaws, i.e. where the tips 44 of the stem pick fingers exit the confines of the curved surfaces 41, is at an upward angle of about 20 degrees from the horizontal. During the crimping of the pick about the flower stem, the fingertips 44 follow the curved surface 41, and, when the jaws are closed, the tangent point at the exit of the curved surface 41 is approximately horizontal, and the fingers 6 and fingertips 44 are substantially compressing the flower stem about its entire periphery.

With flower stems varying considerably in diameter, in order to secure the stem pick 5 to a flower stem 31, the crimping jaws of FIG. 5 are designed to secure a stem pick to the smallest expected diameter. As a result, flower stems of greater diameter than the minimum will suffer a crushing destructive pressure.

By the design of the jaws 9a of FIG. 31, the fingertips 44 are forced to follow a sharp arcuate path near the ends of inner surface 41a, the tangent at the exit point of the curved surface 41a being substantially vertical so as to direct the fingertips 44 downwardly to pierce the flower stem 31 from above. Even though the fingertips 44 pierce a good distance into the flower stem 31, there is insignificant disruption of the transpiration of water through the stem and a total elimination of circumferential pressure directed inwardly about the surface of the flower stem. Thus, as illustrated in FIG. 31, crimping is effected by inserting only the tips 44 of the gripping fingers 6 into the flower stem 31, and damage to the flower stem is minimal.

Figure 32:
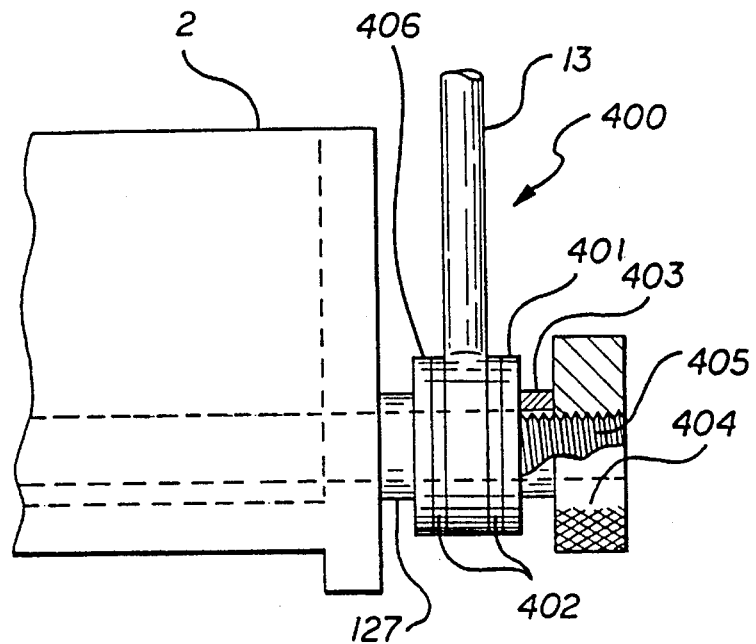
FIG. 32 illustrates a device for adjusting the crimping pressure of the pick about a flower stem.

Another optional feature of the invention to assist in preventing damage to the flower stem upon applying a pick is shown in FIG. 32. A crimp pressure adjusting assembly 400 is provided at the connection of the handle 13 to the shaft 127 entering the housing 2 of a stem picking machine. Previously described examples of the operation of the stem picking machine have had a direct connection between the handle 13 and operating shaft 127. In the example of FIG. 32, the torque applied to shaft 127 by handle 13 is effected through a clutching mechanism comprising a pair of clutch pads 402 surrounding the bottom opening of handle 13 through which shaft 127 passes. The end 405 of shaft 127 is shown to be threaded, and a knurled threaded nut 404 is screwed onto the threaded portion 405 and is conveniently spaced from a pressure washer 401 by means of a spacer 403. A clutch pressure plat 406 is fixed to the shaft 127. Pressure washer 401 may be of a material such as nylon or may be formed as a curved flat steel spring washer. In any event, as nut 404 is screwed tighter against pressure washer 401, clutch pads 402, being confined and compressed between clutch plate 406 and pressure washer 401, grasp the bottom of handle 13, and a greater torque is applied to shaft 127. Obviously, loosening nut 404 removes pressure of the clutch pad against handle 13, so that the amount of torque applied to shaft 127 is less.

By proper adjustment of nut 404, the crimping pressure of the jaws 9 or 9a will likewise be affected. Thus, when applying picks to the stems of a large diameter flower, nut 404 is loosened to some extent so as not to cause jaws 9 or 9a to exert excessive pressure on the pick fingers 6 wrapped about the flower stem 31. Likewise, when stemming flowers having smaller diameter stems, a tightening of nut 404 will translate to a higher torque being applied to shaft 127 and a greater crimping force by jaws 9 and 9a so as to further crimp fingers 6 of the stem pick 5 to more completely surround the stem. The clutch assembly 400 is exemplary of any of a number of clutch arrangements that can be utilized, including clutches that may be used with automatic electromechanical or pneumatic models of stem picking machines made in accordance with the present invention.

All of the embodiments of the invention shown and described herein were developed as low cost units, and with the design goal to conduct all machine operations with minimum operator effort.

It will be apparent to those skilled in the art that changes may be made in the construction and in the operation of the various components, elements and assemblies described herein, or in the steps or the sequence of steps of the methods described herein, without departing from the spirit and scope of the invention. For example, the timing of the cutting relative to the attachment of the stem pick is not critical. The stem can be cut before, during, or after attachment of the stem pick to the flower stem. Specific design details as to size, shape, ruggedness, etc. are left to the artisan's decision, e.g. the cutting assemblies of FIGS. 12–14, 16–19, and 27–30 may be configured to cut flower stems to a minimum length from the bloom of 2 ½', and to remove from ½" to 6" of stem length. It will also be understood by those skilled in the art that the electromechanical elements of FIGS. 21–27 can be replaced by electropneumatic or strictly pneumatic equivalent elements which can employ an inexpensive small air compressor. Further, in those embodiments where spacing permits it, the operator of the various devices shown and described herein may choose to insert the flower stem to be cut at an angle. The benefits realized by this operation have been explained infra, especially in the description of FIGS. 4 and 15e in which angled knife arrangements were discussed. The arrangements described herein are merely examples of preferred embodiments of the invention in these respects. Accordingly, the invention is to be interpreted only as to the scope of the appended claims.

What is claimed is:

1. An apparatus for cutting the stem of a flower and applying a stem pick to the cut flower stem, said apparatus comprising:

means for attaching a stem pick to the stem of a flower in a first mode of operation;

pick positioning means for moving another stem pick, in a second mode of operation, into a position ready for attachment to another flower stem; and electromechanical means for automatically operating said means for attaching a stem pick and said pick positioning means, said electromechanical means comprising a transmission for mutually exclusively operating said means for attaching a stem pick and said pick positioning means and wherein said transmission further comprises:

a first actuator coupled to, and thereby operating, said means for attaching a stem pick;

a second actuator coupled to, and thereby operating, said pick positioning means; and a clutch means for energizing one or the other of said actuators, and for deenergizing said first actuator after a stem pick has been attached to the flower stem by said means for attaching a stem pick, and deenergizing said second actuator after a stem pick has been moved into position for attachment by said pick positioning means.

2. The apparatus as claimed in claim 1, wherein said first actuator comprises a safety release mechanism for decoupling said first actuator from said means for attaching a stem pick, in the event that attaching a stem pick to the flower stem has been completed before deenergization of said first actuator by said clutch means.

3. The apparatus as claimed in claim 1, comprising:

a crimp solenoid coupled to said clutch means for effecting energization of said first actuator; and a pick feed solenoid coupled to said clutch means for effecting energization of said second actuator.

4. The apparatus as claimed in claim 3, comprising:

an electromechanical stem cutting device and a knife for cutting a flower stem under control of said electromechanical stem cutting device; and a cutting device switch for applying power, when closed, to energize said electromechanical stem cutting device and thereby cut the flower stem.

5. The apparatus as claimed in claim 4, wherein said cutting device switch, upon closure, applies power to said crimp solenoid to initiate the action of said means for attaching a stem pick for attachment of a stem pick to the flower stem.

6. The apparatus as claimed in claim 5, comprising:

first switch means for maintaining power, when closed, to said crimp solenoid immediately after opening of said cutting device switch;

second switch means for applying power to said pick feed solenoid after attachment of a pick to a flower stem is completed, and simultaneously removing power from said crimp solenoid and opening said first switch means; and third switch means for removing power from said pick feed solenoid after a pick has been moved to a position for attachment, and simultaneously making power available to said crimp solenoid upon the next closure of said cutting device switch.

7. The apparatus as claimed in claim 5, wherein:

said first, second, and third switch means are microswitches;

said first actuator includes a cam for operating said first and second switch means; and said second actuator includes a cam for operating said third switch means.

* * * * *